US012349055B2

(12) United States Patent
Won

(10) Patent No.: US 12,349,055 B2
(45) Date of Patent: *Jul. 1, 2025

(54) METHOD AND APPARATUS FOR HANDLING NON-INTEGRITY PROTECTED REJECT MESSAGES IN NON-PUBLIC NETWORKS

(71) Applicant: Nokia Technologies Oy, Espoo (FI)

(72) Inventor: Sung Hwan Won, Flower Mound, TX (US)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,967

(22) Filed: Feb. 1, 2024

(65) Prior Publication Data
US 2024/0357482 A1   Oct. 24, 2024

Related U.S. Application Data

(63) Continuation of application No. 17/949,402, filed on Sep. 21, 2022, now Pat. No. 11,937,177, which is a
(Continued)

(51) Int. Cl.
*H04W 48/18* (2009.01)
*H04W 48/02* (2009.01)
(Continued)

(52) U.S. Cl.
CPC .......... *H04W 48/18* (2013.01); *H04W 48/02* (2013.01); *H04W 48/16* (2013.01); *H04W 60/04* (2013.01); *H04W 76/18* (2018.02)

(58) Field of Classification Search
CPC ..... H04W 48/18; H04W 48/02; H04W 48/16; H04W 60/04; H04W 76/18; H04W 12/122; H04W 8/183
See application file for complete search history.

(56) References Cited

U.S. PATENT DOCUMENTS 11,477,727 B2 * 10/2022 Won ............... H04W 76/18
2015/0181639 A1   6/2015 Liu
(Continued)

FOREIGN PATENT DOCUMENTS

CN          108293188 A      7/2018
WO    WO 2018/085427 A1     5/2018
(Continued)

OTHER PUBLICATIONS

Ericsson et al., "Lists of temporarily and permanently forbidden SNPNs", 3GPP TSG-CT WG1 Meeting #119, Change Request CR 0438, C1-194076, (Aug. 26-30, 2019), 8 pages.
(Continued)

*Primary Examiner* — Diane D Mizrahi
(74) *Attorney, Agent, or Firm* — ALSTON & BIRD LLP

(57) ABSTRACT

Methods and apparatus, including computer program products, are provided for handling non-integrity protected reject messages in non-public networks. In some example embodiments, there may be provided an apparatus including at least one processor and at least one memory including computer program code, the at least one memory and the computer program code configured to, with the at least one processor, cause the apparatus to at least: receive, from a network function in a standalone non-public network (SNPN), a reject message, wherein information in the reject message indicates that the apparatus is not allowed to access the SNPN by subscription; and add the identity of the SNPN in a list of forbidden SNPNs associated with an access via which the apparatus sent a request and subsequently received the reject message.

15 Claims, 9 Drawing Sheets

Related U.S. Application Data continuation of application No. 16/945,297, filed on Jul. 31, 2020, now Pat. No. 11,477,727.

(60) Provisional application No. 62/886,627, filed on Aug. 14, 2019.

(51) Int. Cl.
  *H04W 48/16*  (2009.01)
  *H04W 60/04*  (2009.01)
  *H04W 76/18*  (2018.01)

(56) References Cited

U.S. PATENT DOCUMENTS

| | | |
|---|---|---|
| 2018/0070238 A1 | 3/2018 | Agarwal et al. |
| 2019/0045423 A1 | 2/2019 | Kumar et al. |
| 2019/0053054 A1 | 2/2019 | Seshadri et al. |
| 2021/0211975 A1 | 7/2021 | Prabhakar et al. |

FOREIGN PATENT DOCUMENTS

| | | |
|---|---|---|
| WO | WO 2019/004901 A1 | 1/2019 |
| WO | WO 2019/032236 A1 | 2/2019 |

OTHER PUBLICATIONS

Ericsson, "Discussion to SNPN selection", 3GPP TSG CT WG1 Meeting #116, C1-192016, (Apr. 8-12, 2019), 6 pages.
Ericsson, "Submission for information on Commonalities in solutions for Non-Public Network deployments", 3GPP TSG-RAN WG2 #106, R2-1907313, (May 13-17, 2019), 11 pages.
Qualcomm Incorporated et al., "Adding support for SNPNs (Stand-alone Non-Public Networks)", 3GPP TSG-CT WG1 Meeting #117, Change Request 0963, C1-193705, (May 13-17, 2019), 31 pages.
Qualcomm Incorporated, "Adding support for SNPNs (Stand-alone Non-Public Networks)", 3GPP TSG-CT WG1 Meeting #116, Change Request CR 0963, C1-192126, (Apr. 8-12, 2019), 34 pages.
"3rd Generation Partnership Project; Technical Specification Group Core Network and Terminals; Mobile radio Interface Layer 3 specification; Core network protocols; Stage 3 (Release 16)", 3GPP TS 24.008, V16.1.0, Jun. 2019, pp. 1-793.
"3rd Generation Partnership Project; Technical Specification Group Core Network and Terminals; Non-Access-Stratum (NAS) functions related to Mobile Station (MS) in idle mode (Release 16)", 3GPP TS 23.122, V16.2.0, Jun. 2019, pp. 1-72.
"3rd Generation Partnership Project; Technical Specification Group Core Network and Terminals; Non-Access-Stratum (NAS) Protocol for 5G System (5GS); Stage 3 (Release 16)", 3GPP TS 24.501 v16.1.0, (Jun. 14, 2019), 541 pages.
"3rd Generation Partnership Project; Technical Specification Group Core Network and Terminals; Non-Access-Stratum (NAS) protocol for 5G System (5GS); Stage 3; (Release 16)", 3GPP TS 24.501, V16.2.0, Sep. 2019, pp. 1-611.
"3rd Generation Partnership Project; Technical Specification Group Core Network and Terminals; Non-Access-Stratum (NAS) protocol for Evolved Packet System (EPS); Stage 3 (Release 16)", 3GPP TS 24.301, V16.1.1, Jun. 2019, pp. 1-549.
"3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304, V15.4.0, Jun. 2019, pp. 1-54.
"3rd Generation Partnership Project; Technical Specification Group Radio Access Network; NR; User Equipment (UE) procedures in Idle mode and RRC Inactive state (Release 15)", 3GPP TS 38.304, V15.4.0, Jun. 2019, pp. 1-29.
"3rd Generation Partnership Project; Technical Specification Group Services and System Aspects; Procedures for the 5G System; Stage 2 (Release 16)", 3GPP TS 23.502, V16.1.1, Jun. 2019, pp. 1-495.
"3rd Generation Partnership Project; Technical Specification Group Services and System Aspects; System Architecture for the 5G System; Stage 2 (Release 16)", 3GPP TS 23.501, V16.1.0, Jun. 2019, pp. 1-368.
"Handling of non-integrity protected messages in an SNPN", 3GPP TSG-CT WG1 Meeting #119, C1-194abc, Nokia, Aug. 26-30, 2019, 47 pages.
"T3247 for a UE operating in SNPN access mode", 3GPP TSG-CT WG1 Meeting #119, C1-194abc, Nokia, Aug. 26-30, 2019, 6 pages.
"UE behaviour upon receiving non-integrity protected NAS reject messages in 5GS", 3GPP TSG-CT WG1 Meeting #117, C1-193912, Vodafone, May 13-17, 2019, 36 pages.
Examination Report for Indian Application No. 202247012529 dated Jul. 26, 2022, 9 pages.
Extended European Search Report for European Application No. 20852194.8 dated Aug. 7, 2023, 11 pages.
International Search Report and Written Opinion for Patent Cooperation Treaty Application No. PCT/FI2020/050503 dated Oct. 28, 2020, 16 pages.
Non-Final Office Action for U.S. Appl. No. 16/945,297 dated Feb. 4, 2022.
Non-Final Office Action for U.S. Appl. No. 17/949,402 dated Jun. 2, 2023.
Notice of Allowance for Taiwanese Patent Application No. 109127561 dated Oct. 28, 2021, 3 pages.
Notice of Allowance for U.S. Appl. No. 16/945,297 dated Jun. 10, 2022.
Notice of Allowance for U.S. Appl. No. 17/949,402 dated Nov. 2, 2023.
Office Action for Argentina Application No. 20200102300 dated Apr. 14, 2023, 6 pages.
Office Action for Argentina Application No. 20200102300 dated Nov. 14, 2023, 10 pages.
Office Action for Bangladesh Application No. –237/2020/1724 dated May 8, 2022, 1 page.
Office Action for Bangladesh Patent Application No. –237/2020 dated Oct. 3, 2021, 1 page.
Office Action for Indonesian Application No. P00202203130 dated Jun. 25, 2024, 4 pages.
Office Action for Taiwanese Patent Application No. 109127561 dated Apr. 20, 2021, 26 pages.
Qualcomm Incorporated, "Adding Support for SNPNs (Stand-Alone Non-Public Networks", 3GPP TSG-CT WG1 Meeting #117, Change Request 24.501 CR 0963, (May 13-17, 2019), 31 pages.
Qualcomm Incorporated, "SNPN (Stand-Alone Non-Public Network) Selection", 3GPP TSG-CT WG1 Meeting #116, C1-192125, (Apr. 8-12, 2019), 8 pages.
Office Action for Chinese Application No. 202080071657.0 dated Nov. 8, 2024, 17 pages.
Office Action for Indonesian Application No. P00202203130 dated Mar. 13, 2025, 4 pages.
Office Action for Malaysian Application No. PI2022000742 dated Mar. 25, 2025, 6 pages.

\* cited by examiner

METHOD AND APPARATUS FOR HANDLING NON-INTEGRITY PROTECTED REJECT MESSAGES IN NON-PUBLIC NETWORKS

CROSS REFERENCE TO RELATED APPLICATION

This application is a continuation of and claims priority to U.S. application Ser. No. 17/949,402, filed Sep. 21, 2022, and titled, "METHOD AND APPARATUS FOR HANDLING NON-INTEGRITY PROTECTED REJECT MESSAGES IN NON-PUBLIC NETWORKS," which is a continuation of and claims priority to U.S. application Ser. No. 16/945,297, filed Jul. 31, 2020, and titled, "METHOD AND APPARATUS FOR HANDLING NON-INTEGRITY PROTECTED REJECT MESSAGES IN NON-PUBLIC NETWORKS," which claims priority to U.S. Application No. 62/886,627, filed Aug. 14, 2019, and titled "METHOD AND APPARATUS FOR HANDLING NON-INTEGRITY PROTECTED REJECT MESSAGES IN NON-PUBLIC NETWORKS," the contents of which are hereby incorporated by reference in their entireties.

FIELD

The subject matter described herein relates to wireless telecommunications.

BACKGROUND

Telecommunication networks, such as the fifth generation of mobile networks (5G networks) are expected to be the next major phase of mobile telecommunication standards and to bring many improvements in mobile network user experience. For instance, 5G networks should provide new technical solutions allowing a greater throughput, lower latency, higher reliability, higher connectivity and higher mobility range.

In addition to these improvements in terms of performance, 5G networks are also expected to extend the flexibility in the network usage and to allow providing users with a wider range of use cases and business models.

However, as the 5G system, supports an increasing number of devices and services including applications with a wide range of use cases and diverse needs with respect to bandwidth, latency, and reliability requirements, user equipment operating on and communicating through the cellular system are increasingly subjected to malicious communications, such as a denial of service (DoS) attack.

SUMMARY

Methods, apparatuses, and computer program products are provided for handling non-integrity protected reject messages in non-public networks.

In some example embodiments, there may be provided an apparatus including at least one processor and at least one memory including computer program code, the at least one memory and the computer program code configured to, with the at least one processor, cause the apparatus to at least: receive, from a network function in a standalone non-public network (SNPN), a reject message, wherein information in the reject message indicates that the apparatus is not allowed to access the SNPN by subscription; and add the identity of the SNPN in a list of forbidden SNPNs for which the apparatus sent a request for access by subscription and subsequently received the reject message. In some embodiments, the information in the reject message comprises a fifth-generation mobility management (5GMM) cause value of #72, #74, or #75. In some embodiments, the at least one memory and the computer program code are further configured to, with the at least one processor, cause the apparatus to at least: set a fifth-generation system (5GS) update status to 5U3 ROAMING NOT ALLOWED; store the 5GS update status; and delete each of a 5G Globally Unique Temporary Identity (5G-GUTI), a last visited registered (TAI), a TAI list, and an key set identifier (ngKSI). In some embodiments, the at least one memory and the computer program code are further configured to, with the at least one processor, cause the apparatus to at least: cause the apparatus to enter a state of 5GMM-DEREGISTERED or a state of 5GMM-DEREGISTERED.PLMN-SEARCH; and cause the apparatus to perform a SNPN selection. In some embodiments, the at least one memory and the computer program code are further configured to, with the at least one processor, cause the apparatus to at least: determine whether the reject message has been successfully integrity checked by a non-access stratum (NAS); and, if the reject message has been successfully integrity checked by the NAS, set a SNPN-specific attempt counter for non-3rd Generation Partnership Project (non-3GPP) access for the SNPN to a user equipment implementation-specific maximum value. In some embodiments, the list of forbidden SNPNs is a permanently forbidden SNPNs list. In some embodiments, the list of forbidden SNPNs is a temporarily forbidden SNPNs list. In some embodiments, the list of forbidden SNPNs is a permanently forbidden SNPNs list for non-3GPP access. In some embodiments, the list of forbidden SNPNs is a temporarily forbidden SNPNs list for non-3GPP access.

In other example embodiments, there may be provided a method, such as a computer-implemented method, which may be implemented using, for instance, an apparatus such as described herein. In some embodiments, the method can comprise: receiving, from a network function in a standalone non-public network (SNPN), a reject message, wherein information in the reject message indicates that the apparatus is not allowed to access the SNPN by subscription; and adding the identity of the SNPN in a list of forbidden SNPNs for which the apparatus sent a request for access by subscription and subsequently received the reject message. In some embodiments, the information in the reject message comprises a 5GMM cause value of #72, #74, or #75. In some embodiments, the method can further comprise setting a 5GS update status to 5U3 ROAMING NOT ALLOWED; storing the 5GS update status; and deleting each of a 5G-GUTI, a last visited registered TAI, a TAI list, and an ngKSI. In some embodiments, the method can further comprise causing the apparatus to enter a state of 5GMM-DEREGISTERED or a state of 5GMM-DEREGISTERED.PLMN-SEARCH; and causing the apparatus to perform a SNPN selection. In some embodiments, the method can further comprise determining whether the reject message has been successfully integrity checked by a NAS; and, if the reject message has been successfully integrity checked by the NAS, setting a SNPN-specific attempt counter for non-3GPP access for the SNPN to a user equipment implementation-specific maximum value. In some embodiments, the list of forbidden SNPNs is a permanently forbidden SNPNs list. In some embodiments, the list of forbidden SNPNs is a temporarily forbidden SNPNs list. In some embodiments, the list of forbidden SNPNs is a permanently forbidden SNPNs list for non-3GPP access. In some embodiments, the list of forbidden SNPNs is a temporarily forbidden SNPNs list for non-3GPP access.

In other example embodiments, there may be provided an apparatus, such as an apparatus comprising at least one processor and at least one memory storing computer program code, which may be configured to implement methods such as described herein. In some embodiments, the apparatus can comprise means for receiving, from a network function in a standalone non-public network (SNPN), a reject message, wherein information in the reject message indicates that the apparatus is not allowed to access the SNPN by subscription. In some embodiments, the apparatus can comprise means for adding the identity of the SNPN in a list of forbidden SNPNs for which the apparatus sent a request for access by subscription and subsequently received the reject message. In some embodiments, the information in the reject message comprises a 5GMM cause value of #72, #74, or #75. In some embodiments, the apparatus can further comprise means for setting a 5GS update status to 5U3 ROAMING NOT ALLOWED; means for storing the 5GS update status; and means for deleting each of a 5G-GUTI, a last visited registered TAI, a TAI list, and an ngKSI. In some embodiments, the apparatus can further comprise means for causing the apparatus to enter a state of 5GMM-DEREGISTERED or a state of 5GMM-DEREGISTERED.PLMN-SEARCH; and means for causing the apparatus to perform a SNPN selection. In some embodiments, the apparatus can further comprise means for determining whether the reject message has been successfully integrity checked by a NAS; and means for, if the reject message has been successfully integrity checked by the NAS, setting a SNPN-specific attempt counter for non-3GPP access for the SNPN to a user equipment implementation-specific maximum value. In some embodiments, the list of forbidden SNPNs is a permanently forbidden SNPNs list. In some embodiments, the list of forbidden SNPNs is a temporarily forbidden SNPNs list. In some embodiments, the list of forbidden SNPNs is a permanently forbidden SNPNs list for non-3GPP access. In some embodiments, the list of forbidden SNPNs is a temporarily forbidden SNPNs list for non-3GPP access.

In other example embodiments, there may be provided a computer program product, such as a non-transitory computer readable medium including program code which, when executed, causes operations comprising: receiving, from a network function in a standalone non-public network (SNPN), a reject message, wherein information in the reject message indicates that the apparatus is not allowed to access the SNPN by subscription; and adding the identity of the SNPN in a list of forbidden SNPNs for which the apparatus sent a request for access by subscription and subsequently received the reject message. In some embodiments, the information in the reject message comprises a 5GMM cause value of #72, #74, or #75. In some embodiments, the program code causes further operations comprising: setting a 5GS update status to 5U3 ROAMING NOT ALLOWED; storing the 5GS update status; and deleting each of a 5G-GUTI, a last visited registered TAI, a TAI list, and an ngKSI. In some embodiments, the program code causes further operations comprising: causing the apparatus to enter a state of 5GMM-DEREGISTERED or a state of 5GMM-DEREGISTERED.PLMN-SEARCH; and causing the apparatus to perform a SNPN selection. In some embodiments, the program code causes further operations comprising: determining whether the reject message has been successfully integrity checked by a NAS; and, if the reject message has been successfully integrity checked by the NAS, setting a SNPN-specific attempt counter for non-3GPP access for the SNPN to a user equipment implementation-specific maximum value. In some embodiments, the list of forbidden SNPNs is a permanently forbidden SNPNs list. In some embodiments, the list of forbidden SNPNs is a temporarily forbidden SNPNs list. In some embodiments, the list of forbidden SNPNs is a permanently forbidden SNPNs list for non-3GPP access. In some embodiments, the list of forbidden SNPNs is a temporarily forbidden SNPNs list for non-3GPP access.

According to yet another embodiment, an apparatus is provided that includes at least one processor and at least one memory including computer program code, the at least one memory and the computer program code configured to, with the at least one processor, cause the apparatus to at least: store a list of subscriber data, wherein each of entries in the list of subscriber data comprises subscriber data used to access a standalone non-public network (SNPN); maintain one or more lists of forbidden SNPNs and one or more SNPN-specific attempt counters; and, in an instance in which an entry of the list of subscriber data is reconfigured or removed, determine whether the identity of the SNPN associated with the reconfigured or removed entry should be removed from the one or more lists of forbidden SNPNs based on the one or more SNPN-specific attempt counters. In some embodiments, the one or more lists of forbidden SNPNs comprises a permanently forbidden SNPNs list. In some embodiments, the one or more lists of forbidden SNPNs comprises a temporarily forbidden SNPNs list. In some embodiments, the one or more lists of forbidden SNPNs comprises a permanently forbidden SNPNs list for non-3GPP access. In some embodiments, the one or more lists of forbidden SNPNs comprises a temporarily forbidden SNPNs list for non-3GPP access. In some embodiments, the one or more SNPN-specific attempt counters comprises a SNPN-specific attempt counter for 3GPP access. In some embodiments, the one or more SNPN-specific attempt counters comprises a SNPN-specific attempt counter for non-3GPP access.

According to still another embodiments, a method is provided, the method comprising storing a list of subscriber data, wherein each of entries in the list of subscriber data comprises subscriber data used to access a standalone non-public network (SNPN); maintaining one or more lists of forbidden SNPNs and one or more SNPN-specific attempt counters; and, in an instance in which an entry of the list of subscriber data is reconfigured or removed, determining whether the identity of the SNPN associated with the reconfigured or removed entry should be removed from the one or more lists of forbidden SNPNs based on the one or more SNPN-specific attempt counters. In some embodiments, the one or more lists of forbidden SNPNs comprises a permanently forbidden SNPNs list. In some embodiments, the one or more lists of forbidden SNPNs comprises a temporarily forbidden SNPNs list. In some embodiments, the one or more lists of forbidden SNPNs comprises a permanently forbidden SNPNs list for non-3GPP access. In some embodiments, the one or more lists of forbidden SNPNs comprises a temporarily forbidden SNPNs list for non-3GPP access. In some embodiments, the one or more SNPN-specific attempt counters comprises a SNPN-specific attempt counter for 3GPP access. In some embodiments, the one or more SNPN-specific attempt counters comprises a SNPN-specific attempt counter for non-3GPP access.

According to another embodiment, an apparatus is provided, such as an apparatus comprising one or more processors and one or more memory storing computer program code. Such an apparatus can be configured to carry out any of the methods described herein, such as by using the one or more processors to carry out computer-implemented instructions stored on the one or more memory. In some embodiments, the apparatus can comprise means for storing a list of subscriber data, wherein each of entries in the list of subscriber data comprises subscriber data used to access a standalone non-public network (SNPN); means for maintaining one or more lists of forbidden SNPNs and one or more SNPN-specific attempt counters; and means for, in an instance in which an entry of the list of subscriber data is reconfigured or removed, determining whether the identity of the SNPN associated with the reconfigured or removed entry should be removed from the one or more lists of forbidden SNPNs based on the one or more SNPN-specific attempt counters. In some embodiments, the one or more lists of forbidden SNPNs comprises a permanently forbidden SNPNs list. In some embodiments, the one or more lists of forbidden SNPNs comprises a temporarily forbidden SNPNs list. In some embodiments, the one or more lists of forbidden SNPNs comprises a permanently forbidden SNPNs list for non-3GPP access. In some embodiments, the one or more lists of forbidden SNPNs comprises a temporarily forbidden SNPNs list for non-3GPP access. In some embodiments, the one or more SNPN-specific attempt counters comprises a SNPN-specific attempt counter for 3GPP access. In some embodiments, the one or more SNPN-specific attempt counters comprises a SNPN-specific attempt counter for non-3GPP access.

In another example embodiment, a computer program product is provided that comprises a non-transitory computer readable medium including program code which, when executed, causes operations comprising: storing a list of subscriber data, wherein each of entries in the list of subscriber data comprises subscriber data used to access a standalone non-public network (SNPN); maintaining one or more lists of forbidden SNPNs and one or more SNPN-specific attempt counters; and, in an instance in which an entry of the list of subscriber data is reconfigured or removed, determining whether the identity of the SNPN associated with the reconfigured or removed entry should be removed from the one or more lists of forbidden SNPNs based on the one or more SNPN-specific attempt counters. In some embodiments, the one or more lists of forbidden SNPNs comprises a permanently forbidden SNPNs list. In some embodiments, the one or more lists of forbidden SNPNs comprises a temporarily forbidden SNPNs list. In some embodiments, the one or more lists of forbidden SNPNs comprises a permanently forbidden SNPNs list for non-3GPP access. In some embodiments, the one or more lists of forbidden SNPNs comprises a temporarily forbidden SNPNs list for non-3GPP access. In some embodiments, the one or more SNPN-specific attempt counters comprises a SNPN-specific attempt counter for 3GPP access. In some embodiments, the one or more SNPN-specific attempt counters comprises a SNPN-specific attempt counter for non-3GPP access.

According to another embodiment, an apparatus is provided, the apparatus comprising at least one processor; and at least one memory including computer program code, the at least one memory and the computer program code configured to, with the at least one processor, cause the apparatus to at least: store a list of subscriber data, wherein each entry of a plurality of entries in the list of subscriber data comprises subscriber data used to access standalone non-public networks (SNPNs); receive, from a network function in a (SNPN, a non-integrity-protected reject message, wherein information in the reject message implies that the entry used to access the SNPN is invalid; upon receipt of the reject message, determining whether the entry used to access the SNPN is invalid for the access via which the apparatus sent a request message and/or received the reject message and start T3247; and maintain one or more counters for the SNPN, wherein the one or more counters are used to determine whether the entry used to access the SNPN should be set to valid upon T3247 expiry. In some embodiments, the information in the reject message comprises a 5GMM cause value of #3 or #6. In some embodiments, the information in the reject message comprises an AUTHENTICATION REJECT message. In some embodiments, the reject message is a REGISTRATION REJECT message or a SERVICE REJECT message. In some embodiments, the one or more counters comprise one counter for the entry for the current SNPN considered invalid for 3GPP access events and one counter for the entry for the current SNPN considered invalid for non-3GPP access events.

In yet another embodiment, a method is provided, the method comprising storing a list of subscriber data, wherein each entry of a plurality of entries in the list of subscriber data comprises subscriber data used to access standalone non-public networks (SNPNs); receiving, from a network function in a (SNPN, a non-integrity-protected reject message, wherein information in the reject message implies that the entry used to access the SNPN is invalid; upon receipt of the reject message, determining whether the entry used to access the SNPN is invalid for the access via which the apparatus sent a request message and/or received the reject message and start T3247; and maintaining one or more counters for the SNPN, wherein the one or more counters are used to determine whether the entry used to access the SNPN should be set to valid upon T3247 expiry. In some embodiments, the information in the reject message comprises a 5GMM cause value of #3 or #6. In some embodiments, the information in the reject message comprises an AUTHENTICATION REJECT message. In some embodiments, the reject message is a REGISTRATION REJECT message or a SERVICE REJECT message. In some embodiments, the one or more counters comprise one counter for the entry for the current SNPN considered invalid for 3GPP access events and one counter for the entry for the current SNPN considered invalid for non-3GPP access events.

According to another embodiment, an apparatus is provided, such as an apparatus comprising one or more processors and one or more memory storing computer program code. Such an apparatus can be configured to carry out any of the methods described herein, such as by using the one or more processors to carry out computer-implemented instructions stored on the one or more memory. In some embodiments, the apparatus can comprise means for storing a list of subscriber data, wherein each entry of a plurality of entries in the list of subscriber data comprises subscriber data used to access standalone non-public networks (SNPNs); means for receiving, from a network function in a (SNPN, a non-integrity-protected reject message, wherein information in the reject message implies that the entry used to access the SNPN is invalid; means for, upon receipt of the reject message, determining whether the entry used to access the SNPN is invalid for the access via which the apparatus sent a request message and/or received the reject message and start T3247; and means for maintaining one or more counters for the SNPN, wherein the one or more counters are used to determine whether the entry used to access the SNPN should be set to valid upon T3247 expiry. In some embodiments, the information in the reject message comprises a 5GMM cause value of #3 or #6. In some embodiments, the information in the reject message comprises an AUTHENTICATION REJECT message. In some embodiments, the reject message is a REGISTRATION REJECT message or a SERVICE REJECT message. In some embodiments, the one or more counters comprise one counter for the entry for the current SNPN considered invalid for 3GPP access events and one counter for the entry for the current SNPN considered invalid for non-3GPP access events.

According to still another embodiment, a computer program product is provided, the computer program product comprising a non-transitory computer readable medium including program code which, when executed, causes operations comprising: storing a list of subscriber data, wherein each entry of a plurality of entries in the list of subscriber data comprises subscriber data used to access standalone non-public networks (SNPNs); receiving, from a network function in a (SNPN, a non-integrity-protected reject message, wherein information in the reject message implies that the entry used to access the SNPN is invalid; upon receipt of the reject message, determining whether the entry used to access the SNPN is invalid for the access via which the apparatus sent a request message and/or received the reject message and start T3247; and maintaining one or more counters for the SNPN, wherein the one or more counters are used to determine whether the entry used to access the SNPN should be set to valid upon T3247 expiry. In some embodiments, wherein the information in the reject message comprises a 5GMM cause value of #3 or #6. In some embodiments, the information in the reject message comprises an AUTHENTICATION REJECT message. In some embodiments, the reject message is a REGISTRATION REJECT message or a SERVICE REJECT message. In some embodiments, the one or more counters comprise one counter for the entry for the current SNPN considered invalid for 3GPP access events and one counter for the entry for the current SNPN considered invalid for non-3GPP access events.

According to another example embodiment, an apparatus is provided, the apparatus comprising at least one processor; and at least one memory including computer program code, the at least one memory and the computer program code configured to, with the at least one processor, cause the apparatus to at least: receive, from a network function in a standalone non-public network (SNPN), a reject message; initiate one or more timers configured to monitor a time elapsed since receiving the reject message; randomly determine a duration value within a predetermined range between a minimum value and a maximum value, the minimum value corresponding to a minimum safe duration for sending a subsequent registration request to the network function; determine via the one or more timers whether the time elapsed since receiving the reject message corresponds to the randomly selected duration value; and, in an instance in which it is determined that the time elapsed corresponds to the randomly selected duration value, send the subsequent registration request to the network entity. In some embodiments, the registration rejection message comprises a cause code indicating why the network entity is unable to register the apparatus. In some embodiments, the at least one memory and the computer program code are further configured to, with the at least one processor, cause the apparatus to at least: determine, based on at least the cause code, whether the registration rejection message is an integrity protected message. In some embodiments, the at least one memory and the computer program code are further configured to, with the at least one processor, cause the apparatus to at least: in an instance in which the registration rejection message is determined to be an integrity protected message, cause the subsequent registration request to be immediately sent to the network entity. In some embodiments, the at least one memory and the computer program code are further configured to, with the at least one processor, cause the apparatus to at least: send the initial registration request to the network entity, the initial registration request comprising at least identifying information for the user equipment. In some embodiments, the one or more counters are associated with entries of a list of subscriber data maintained by the apparatus, the one or more counters comprising: a first counter associated with an entry of the list of subscriber data for a non-private network considered for network access events; and a second counter associated with an entry of the list of subscriber data for a private network considered for network access events. In some embodiments, the list of subscriber data is a list of temporarily or permanently forbidden networks, wherein the at least one memory and the computer program code are further configured to, with the at least one processor, cause the apparatus to at least: in an instance in which, upon expiry of the second counter, the second counter has a value greater than zero but less than the randomly selected duration value, remove the entry of the list of subscriber data for the private network from the list of temporarily or permanently forbidden networks.

According to yet another embodiment, a method is provided, the method comprising receiving, from a network entity, in response to sending an initial registration request, a registration rejection message; initiating one or more timers configured to monitor a time elapsed since receiving the registration rejection message; randomly determining a duration value within a predetermined range between a minimum value and a maximum value, the minimum value corresponding to a minimum safe duration for sending a subsequent registration request to the network entity; determining via the one or more timers whether the time elapsed since receiving the registration rejection message corresponds to the randomly selected duration value; and, in an instance in which it is determined that the time elapsed corresponds to the randomly selected duration value, sending the subsequent registration request to the network entity. In some embodiments, the registration rejection message comprises a cause code indicating why the network entity is unable to register the apparatus. In some embodiments, the method further comprises determining, based on at least the cause code, whether the registration rejection message is an integrity protected message. In some embodiments, the method further comprises, in an instance in which the registration rejection message is determined to be an integrity protected message, causing the subsequent registration request to be immediately sent to the network entity. In some embodiments, the method further comprises sending the initial registration request to the network entity, the initial registration request comprising at least identifying information for the user equipment. In some embodiments, the one or more counters are associated with entries of a list of subscriber data maintained by the apparatus, the one or more counters comprising: a first counter associated with an entry of the list of subscriber data for a non-private network considered for network access events; and a second counter associated with an entry of the list of subscriber data for a private network considered for network access events. In some embodiments, the list of subscriber data is a list of temporarily or permanently forbidden networks, the method further comprising, in an instance in which, upon expiry of the second counter, the second counter has a value greater than zero but less than the randomly selected duration value, removing the entry of the list of subscriber data for the private network from the list of temporarily or permanently forbidden networks.

According to another embodiment, an apparatus is provided, such as an apparatus comprising one or more processors and one or more memory storing computer program code. Such an apparatus can be configured to carry out any of the methods described herein, such as by using the one or more processors to carry out computer-implemented instructions stored on the one or more memory. In some embodiments, the apparatus can comprise means for receiving, from a network entity, in response to sending an initial registration request, a registration rejection message; means for initiating one or more timers configured to monitor a time elapsed since receiving the registration rejection message; means for randomly determining a duration value within a predetermined range between a minimum value and a maximum value, the minimum value corresponding to a minimum safe duration for sending a subsequent registration request to the network entity; means for determining via the one or more timers whether the time elapsed since receiving the registration rejection message corresponds to the randomly selected duration value; and means for, in an instance in which it is determined that the time elapsed corresponds to the randomly selected duration value, sending the subsequent registration request to the network entity. In some embodiments, the registration rejection message comprises a cause code indicating why the network entity is unable to register the apparatus. In some embodiments, the apparatus can further comprise means for determining, based on at least the cause code, whether the registration rejection message is an integrity protected message. In some embodiments, the apparatus further comprises means for, in an instance in which the registration rejection message is determined to be an integrity protected message, causing the subsequent registration request to be immediately sent to the network entity. In some embodiments, the apparatus further comprises means for sending the initial registration request to the network entity, the initial registration request comprising at least identifying information for the user equipment. In some embodiments, the one or more counters are associated with entries of a list of subscriber data maintained by the apparatus, the one or more counters comprising: a first counter associated with an entry of the list of subscriber data for a non-private network considered for network access events; and a second counter associated with an entry of the list of subscriber data for a private network considered for network access events. In some embodiments, the list of subscriber data is a list of temporarily or permanently forbidden networks, and the apparatus can further comprise means for, in an instance in which, upon expiry of the second counter, the second counter has a value greater than zero but less than the randomly selected duration value, removing the entry of the list of subscriber data for the private network from the list of temporarily or permanently forbidden networks.

According to still another embodiment, a computer program product is provided, the computer program product comprising a non-transitory computer readable medium including program code which, when executed, causes operations comprising: receiving, from a network entity, in response to sending an initial registration request, a registration rejection message; initiating one or more timers configured to monitor a time elapsed since receiving the registration rejection message; randomly determining a duration value within a predetermined range between a minimum value and a maximum value, the minimum value corresponding to a minimum safe duration for sending a subsequent registration request to the network entity; determining via the one or more timers whether the time elapsed since receiving the registration rejection message corresponds to the randomly selected duration value; and, in an instance in which it is determined that the time elapsed corresponds to the randomly selected duration value, sending the subsequent registration request to the network entity. In some embodiments, the registration rejection message comprises a cause code indicating why the network entity is unable to register the apparatus. In some embodiments, the program code causes further operations comprising: determining, based on at least the cause code, whether the registration rejection message is an integrity protected message. In some embodiments, the program code causes further operations comprising, in an instance in which the registration rejection message is determined to be an integrity protected message, causing the subsequent registration request to be sent to the network entity. In some embodiments, the program code causes further operations comprising: sending the initial registration request to the network entity, the initial registration request comprising at least identifying information for the user equipment. In some embodiments, the one or more counters are associated with entries of a list of subscriber data maintained by the apparatus, the one or more counters comprising: a first counter associated with an entry of the list of subscriber data for a non-private network considered for network access events; and a second counter associated with an entry of the list of subscriber data for a private network considered for network access events. In some embodiments, the list of subscriber data is a list of temporarily or permanently forbidden networks, wherein the program code causes further operations comprising, in an instance in which, upon expiry of the second counter, the second counter has a value greater than zero but less than the randomly selected duration value, removing the entry of the list of subscriber data for the private network from the list of temporarily or permanently forbidden networks.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
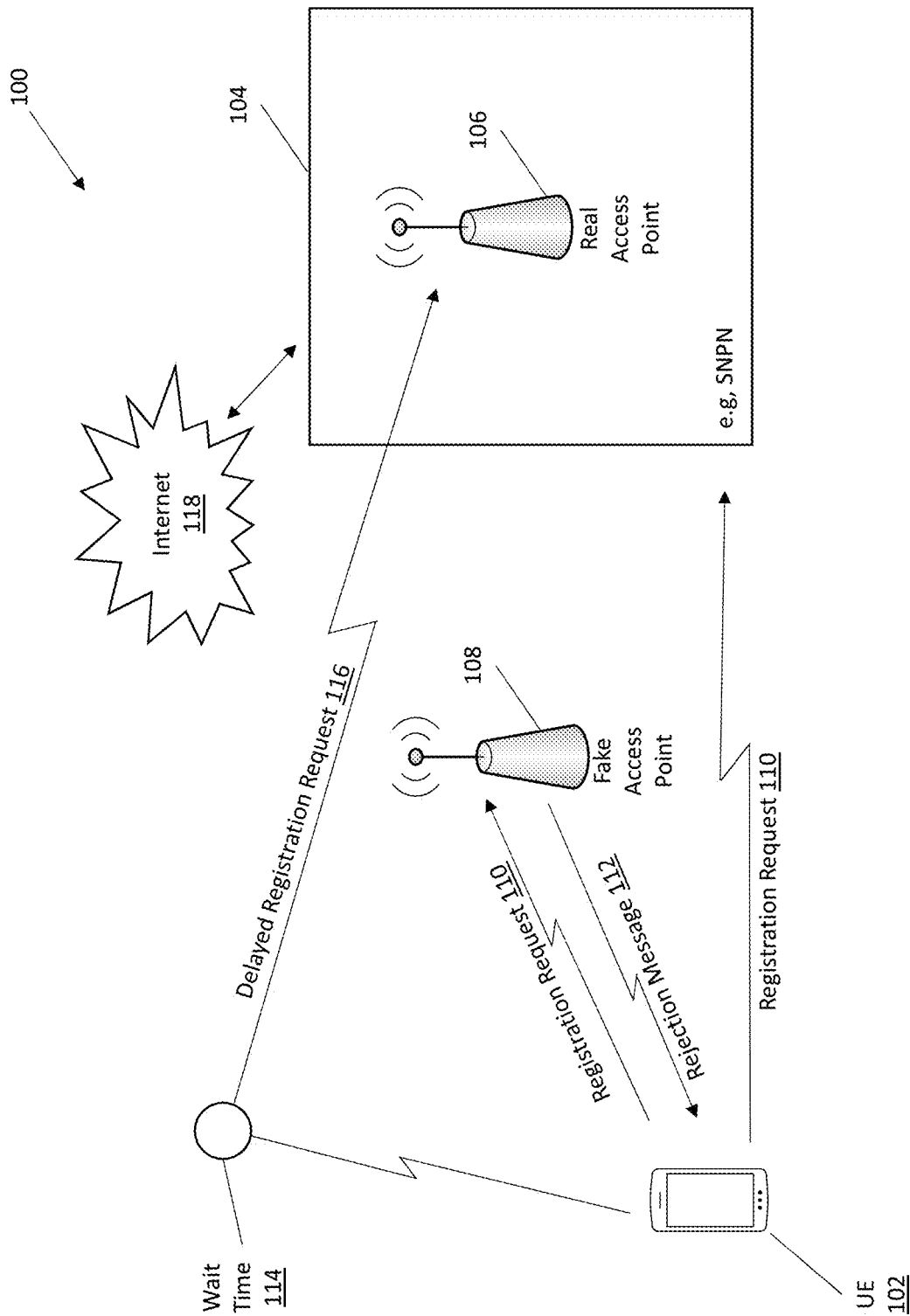
FIG. 1 depicts an example of a portion of a 5G wireless network, in accordance with some example embodiments.

Like labels are used to refer to same or similar items in the drawings.

DETAILED DESCRIPTION

In many cellular systems and telecommunications networks, such as fifth-generation (5G) networks, a user equipment (UE) may be configured to access a Public Land Mobile Network (PLMN), a Stand-alone Non-Public Network (SNPN), or the like through an interaction in which the UE requests registration of the UE with the network, the network registers or rejects the UE, the network transmits a registration message or a rejection message back to the UE, and, if the UE receives a registration message, the UE carries out the procedure for connecting to and authenticating with the network. However, oftentimes and for a variety of reasons, a network will send a UE a rejection message indicating that the network is unable to register the UE for the network.

One of the key problems to solve for the next generation of telecommunications systems (e.g., 5G networks) is how to provide a robust approach for preventing DoS attacks for UE attempting to connect to a network, e.g., a SNPN, in instances in which the network cannot be trusted to provide a wait time for the UE to respond with a control message, the suspected DoS attacker (e.g., malicious network) may have knowledge of predetermined wait times and simply intercept control messages transmitted from the UE at a time immediately outside the predetermined wait time for sending a further control message, when the network is not a PLMN (e.g., when the network is a SNPN), and/or when the desired or initial connection protocol sought between the UE and the network is non-3GPP.

Currently, the 3GPP standard, TS 24.501, the entire contents of which is hereby incorporated herein by reference for all purposes, do not have a robust approach for reducing or preventing Denial of Service (DoS) attacks against such cellular systems and networks. One particular vulnerability arises when the UE transmits a request for registration of the UE with a network and, instead of the desired network responding to the UE's registration request, a malicious or fake network responds with an unsolicited or unprompted registration rejection message. In such circumstances, under the current standard and network protocols, the UE may receive the request and immediately respond by transmitting the same request a second time or may respond with a second request for connection via a different protocol. In such circumstances, the malicious or fake network is ready and waiting for the repeated request or second request from the UE, and can deploy a malicious or fake base station to intercept the registration request. Once the malicious or fake base station receives the repeated or second request for registration from the UE, the malicious or fake base station can transmit back to the UE a message indicating acceptance of the registration request, authentication information, connection protocol information, and the like. The UE is then likely to determine that the malicious or fake base station is, in fact, part of a real, approved network, and will connect to the malicious or fake network via the malicious or fake base station, thus compromising the UE and any data or information stored thereon or transmitted therefrom/thereto.

Other approaches have been discussed with regard to preventing such DoS attacks and subsequent vulnerabilities at the UE level, such as in International Patent Application No. 2019/004901 (hereinafter "the '901 Publication") and the Change Request C1-193912 agreed upon at the 3GPP TSG-CT WG1 meeting #117 on May 13-17, 2019 in Reno, NV, USA (hereinafter "the '912 CR"), the entire contents of each of which are hereby incorporated herein by reference.

According to the '901 Publication, the network provides optional control signaling that indicates a certain wait time for which the wireless communication device should wait before sending a certain control message to network equipment. The UE can then accept or reject the certain time for waiting before sending the certain control message and send, after the wait time, the control message to the network equipment. Alternatively, the UE can reject the certain wait time dictated by the network and instead use a default wait time or trigger an error handline procedure in response to a suspected DoS attack. However, since the network provides the certain wait time, and since that wait time is static and predetermined by the network as being a safe time after which to send a control message, a malicious network or fake access point (e.g., base station, gNodeB, or the like) can simply send the UE the unsolicited rejection message, wait the certain time standardized by the network, and then intercept the repeated or new control message and either perpetuate the DoS attack or attempt to establish a malicious connection with the UE by registering the UE to the fake access point, among other malicious actions possible. Furthermore, since the network provides the certain wait time, the malicious or fake network could be the network providing the certain wait time and then the malicious or fake network can simply wait the known, certain wait time, intercept the postponed control message, and perpetuate the DoS attack, attempt to establish a malicious connection with the UE by registering the UE to the fake access point, or the like. As such, the system, methods, and devices described in the '901 Publication do not present a robust approach for reducing or eliminating DoS attacks based upon the vulnerability associated with malicious reject messages in response to a UE sending a registration request.

With regard to the '912 CR, the approach described is explicitly only for PLMNs and, in fact, indicates that "[t]he UE can request the use of mobile initiated connection only (MICO) mode during the registration procedure (see 3GPP TS 23.501 and 3GPP TS 23.502" and that "[t]he UE shall not request use of MICO mode over non-3GPP access." In other words, the '912 CR indicates that the MICO mode can be used with only public networks and not with non-public networks, which presents both a limitation in terms of network access and UE security if desiring to or required to connect to a non-public (e.g., a non-3GPP) network. As described in the '912 CR, a UE can use a single counter for "SIM/USIM considered invalid for GPRS services" events and a single counter for "SIM/USIM considered invalid for 5GS services over non-3GPP access" events. For each PLMN-specific counter that has a value greater than zero and les than a UE implementation-specific maximum value, the UE shall remove the respective PLMN from the forbidden PLMN list and for each PLMN-specific attempt counter for non-3GPP access that has a value greater than zero and less than the UE implementation-specific maximum value, the UE shall remove the respective PLMN from the forbidden PLMN list for non-3GPP access.

As described herein, a method, an apparatus and a computer program product of at least some example embodiments address this and other issues and limitations of the conventional approaches by providing for a UE to generate a randomly selected wait time from among a pre-approved range of wait times and then remove the network identify or entry from the temporarily forbidden networks list or the permanently forbidden networks list based upon if a counter value is between zero and the randomly selected UE implementation-specific maximum value, e.g., the randomly selected UE implementation-specific maximum value associated with that particular network and that particular control message attempt.

Some embodiments will now be described more fully hereinafter with reference to the accompanying drawings, in which some, but not all, embodiments of the present disclosure are shown. Indeed, various embodiments of the present disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Referring now to FIG. 1, which illustrates an example system that supports communications between a UE and one or more access points, each access point may communicate with one or more stations. The access points may, in turn, communicate with one or more networks. While the access points may communicate via an Long Term Evolution (LTE) or LTE-Advanced (LTE-A) network, other networks may support communications between the access points including those configured in accordance with wideband code division multiple access (W-CDMA), CDMA2000, global system for mobile communications (GSM), general packet radio service (GPRS), the IEEE 802.11 standard including, for example, the IEEE 802.11 ah or 802.1 ac standard or other newer amendments of the standard, wireless local access network (WLAN), Worldwide Interoperability for Microwave Access (WiMAX) protocols, universal mobile telecommunications systems (UMTS) terrestrial radio access network (UTRAN) and/or the like.

The access points and the UE may communicate via wireline communications, but most commonly communicate via wireless communications. For example, the access points and the UE may communicate in a sub 1 GHz band as defined by IEEE 802.11 ah standard or in a 5 GHz band, which may be defined by, for example, IEEE 802.1 lac standard. The access point may be embodied by any of a variety of network entities, such as an access point, a base station, a Node B, a gNodeB (gNB), a radio network controller (RNC), a mobile device/a station (e.g., mobile telephones, smart phones, portable digital assistants (PDAs), pagers, laptop computers, tablet computers or any of numerous other hand held or portable communication devices, computation devices, content generation devices, content consumption devices, or combinations thereof), or the like. The UE may also be embodied by a variety of devices, such as sensors, meters or the like. The sensors and meters may be deployed in a variety of different applications including in utility applications to serve as a gas meter, a water meter, a power meter or the like, in environmental and/or agricultural monitoring applications, in industrial process automation applications, in healthcare and fitness applications, in building automation and control applications and/or in temperature sensing applications. Stations that are embodied by sensors or meters may be utilized in some embodiments to backhaul sensor and meter data. Alternatively, the UE may be embodied by mobile terminals, such as mobile communication devices, e.g., mobile telephones, smart phones, portable digital assistants (PDAs), pagers, laptop computers, tablet computers or any of numerous other hand held or portable communication devices, computation devices, content generation devices, content consumption devices, or combinations thereof. In an embodiment in which the UE is embodied by a mobile terminal, the communication between an access point and the UE may serve to extend the range of wi-fi or another wireless local area network (WLAN), such as by extending the range of a hotspot, and to offload traffic that otherwise would be carried by a cellular or other network.

Figure 2:
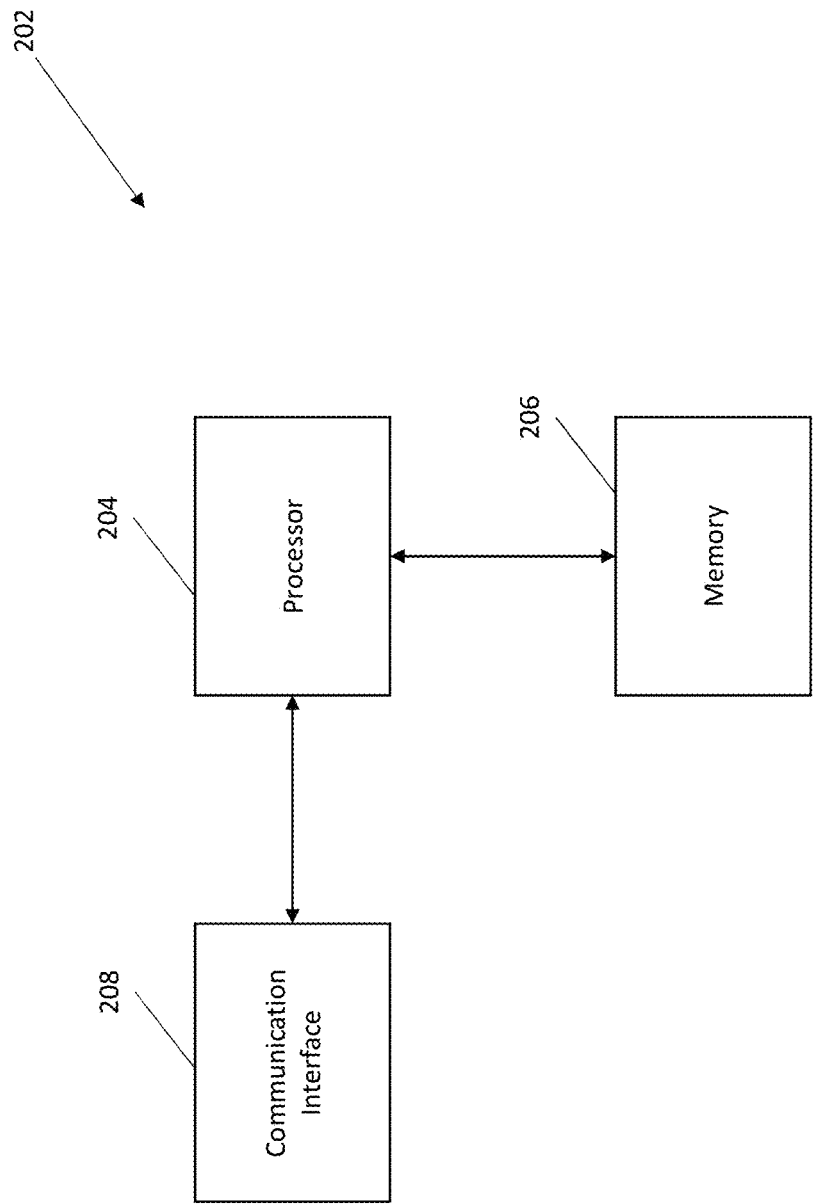
FIG. 2 depicts an example of an apparatus, in accordance with some example embodiments.

The access point and/or the UE may be embodied as or otherwise include an apparatus 202 that is specifically configured to perform the functions of the respective device, as generically represented by the block diagram of FIG. 2. While the apparatus may be employed, for example, by an access point or a UE, it should be noted that the components, devices or elements described below may not be mandatory and thus some may be omitted in certain embodiments. Additionally, some embodiments may include further or different components, devices or elements beyond those shown and described herein.

Disclosed is a method for handling non-integrity protected reject messages in non-public networks. In some embodiments, the method can comprise, generally, of generating a randomly selected wait time from among a pre-approved range of wait times and then removing the network identify or entry from the temporarily forbidden networks list or the permanently forbidden networks list based upon if a counter value is between zero and the UE implementation-specific maximum value, e.g., the UE implementation-specific maximum value associated with that particular network and that particular control message attempt, and/or sending the control message after the randomly selected wait time if the counter value is below the UE implementation-specific maximum value. An example embodiment is provided below with reference to FIG. 1.

FIG. 1 depicts an example of a portion of a 5G wireless network 100, in accordance with some example embodiments.

The 5G wireless network 100 may include a user equipment (UE) 102 configured to wirelessly couple to a radio access network (RAN) 104 (also called a core network 104) being served by a wireless access point 106, such as a base station, wireless local area network access point, home base station, and/or other type of wireless access point.

The network 100 may include the core network 104, which may include non-illustrated features such as an access and mobility management function (AMF), a visiting session management function (V-SMF), a visiting policy control function (v-PCF), a visiting network slice selection function (v-NSSF), and/or a visiting user plane function (V-UPF). In some embodiments, these devices may be associated with a standalone non-public network (SNPN).

In some embodiments, the network 100 and/or the core network 104 may include devices having functions supporting a home public land mobile network (HPLMN) and corresponding functions for "home" wireless local area network (WLAN) access, offloading, and/or non-3GPP access. These devices may include non-illustrated features such as a home SMF, a home PCF, a home NSSF, unified data management, an authentication server function (AUSF), an application function (AF), a home user plane function (H-UPF), and a data network (DN).

FIG. 1 also depicts a fake access point 108 that is not associated with the core network 104 and that is configured, much like the wireless access point 106, to communicate via a set architecture, via nodes, or via other service interfaces with the UE 102. While there are reasons why the fake access point 108 may be collocated nearby the real access point 106 or collocated nearby a suspected location of the UE 102, the fake access point 108 can be located anywhere as long as the fake access point 108 is wirelessly accessible by the UE 102 for purposes of sending and receiving communications, control messages, service requests, and the like.

FIG. 1 also depicts service interfaces, such as 110, 112, and 116, and/or the like. The architecture, nodes (e.g., AMF, V-PCF, H-PCF, H-SMF, and V-SMF as well as other devices), and the service interfaces may be defined in accordance with a standard, such as 3GPP TS 23.501 or 3GPP TS 24.501, although other standards as well as proprietary interfaces may be used.

A network slice refers to a logical network that provides specific network capabilities and network characteristics. The network slice may be considered a logical end-to-end network that can be dynamically created, so that a given UE may access different network slices over the same radio access network (e.g., over the same radio interface). The network slices can provide different services and/or have different QoS needs/requirements. 3GPP TS 23.501, System Architecture for the 5G System, describes examples of network slices.

The UE's subscription information may dictate the configuration information related to the quantity, QoS type, and/or identity of the network slices. The UE's configuration information (provided by the network when registering in a network, such as a SNPN or PLMN, may include one or more network slice identifiers, such as one or more single NSSAIs (S-NSSAI).

When the UE 102 sends a registration request 110, the registration request 110 may be received by or intercepted by both the real access point 106 and the fake access point 108. In some embodiments, the registration request 110 can comprise a REGISTRATION REQUEST without ciphering. Since the UE 102 is in search of a particular network (e.g., the core network 104), the UE 102 will be expecting a response message from the core network 104 or an entity of the core network 104 such as the real access point 106. In some embodiments, the UE 102 may expect a message accepting the request for registration with the network 104 or alternatively a message rejecting the request for registration with the network 104. There are many various reasons why a network 104 might reject a registration request 110, with a non-limiting selection being that the network 104 is not prepared or capable to accept a new user equipment at this time, that the access point 106 is not operating correctly or does not have sufficient bandwidth to manage the registration process or relay such requests, that the authentication information or identifying information provided by the UE 102 with the registration request 110 is either incorrect or unverifiable at this time, and the like. However, while the UE 102 may be expecting a response from the network 104 or a network equipment thereof (e.g., the real access point 106), the UE 102 may instead receive in response to sending the registration request 110 an unsolicited rejection message 112 from the fake access point 108. In some embodiments, the unsolicited rejection message 112 can comprise a non-access stratum (NAS) REJECT MESSAGE, such as a NAS reject message referring to a 5GMM rejection cause value of #7, which refers to a cause of "5GS services not allowed." The NAS, as described herein, is the highest stratum of the control plane between the UE and a mobility management entity (MME) and can function to support mobility of the UE and support session management procedures for establishing and maintaining IP connectivity between the UE and, for instance, a packet data network gateway (PDN GW). In some embodiments, according to the description of UE 102 behavior under 3GPP TS 24.501 for instance, such a REGISTRATION REJECT message shall be processed by the receiving 5GMM entity in the UE 102 and the UE 102 then deletes the 5GMM context (e.g., network information and access credentials) and considers the universal subscriber identity module (USIM) as invalid for 5GS services until switching off or the universal integrated circuit card (UICC) containing the USIM is removed from the UE 102. Under 3GPP TS 24.501, the alternative is silently discarding the unsolicited NAS reject messages (e.g., rejection message 112), which would mean that the UE 102 is unable to verify whether the NAS reject messages are sent by a genuine or faked/malicious network or access point.

Typically, under the current 3GPP standard, in order to avoid a fake network's controlling USIM validity and forbidden PLMN lists for a UE, the UE can maintain a counter and a timer (e.g., a T3247 timer) with a random value uniformly drawn from a predetermined range between 30 minutes and 60 minutes. Then, under the current 3GPP standard, when the UE receives a reject message without integrity protection, the UE can start a timer (e.g., T3247) and immediately try to register to the same network via the other access type (e.g., either 3GPP access or non-3GPP access, depending on the access type first attempted prior to receiving the reject message. Under the current 3GPP standard, after expiry of the timer, the UE can attempt to register to the same network unless the counters prohibit the UE from attempting registration.

While this approach under the current 3GPP standard may be useful for PLMNs, there is not currently any approach for providing such protection for non-public networks, such as SNPNs. The approach described in 3GPP TS 24.501, for instance, and all other current approaches, are insufficient for use with non-public networks because there is a fundamental difference with how subscriber information is stored.

With regard to how subscriber data is stored with the PLMN identity versus the non-public network entity (e.g., SNPN entity), for a PLMN, a single SUPI and associated credentials are stored in the USIM and are used for registering to all PLMNs while for non-public networks such as SNPNs, a single SUPI and associated credentials (an entry of "list of subscriber data" which can be stored in the UE via any suitable storage medium) are used for registering a non-public network, with a different set of "a SUPI and associated credentials" being used for each non-public network 102 (hereinafter also called "the SNPN 102").

The approach described in 3GPP TS 24.501, for instance, and all other current approaches are also insufficient for use with non-public networks because a UE 102 can communicate in MICO mode with PLMNs to enable a quasi-secure channel for communicating regarding REGISTRATION REQUESTS and under which channel the UE 102 would receive a "integrity verified" REJECT MESSAGE which can be received and trusted for purposes of validating or invalidating the USIM for purposes of 5GS services and registration with the PLMN, but the same is not true of non-public networks 104. Notwithstanding the problematic stance of a UE rejecting all networks from which a REJECT MESSAGE is received, there is not currently any way to trust a REJECT MESSAGE from a non-public network 104 (e.g., a SNPN 104) for purposes of managing validation/invalidation of a USIM and listing/delisting of a network on temporarily/permanently forbidden network lists managed by the UE 102. Due to these and other differences between public networks (e.g., PLMNs) and non-public networks 104 (e.g., SNPNs 104), the current 3GPP standard and other currently available protocols and approaches are insufficient to reduce or prevent DoS attacks stemming from a UE 102 receiving a malicious REJECT MESSAGE 112, in response to sending a REGISTRATION REQUEST 110 to a non-public network 104, and re-attempting a REGISTRATION REQUEST 110 with a malicious network or fake access point 108, leading to repeated DoS or successful registration and/or connection of the UE 102 with a rogue access point 108. If the malicious network or rogue access point 108 can spoof a basic service set identifier (BSSID) or wireless message authentication code (MAC) address, or other credentials that can be "verified" against a list of authorized or trusted non-public networks stored at the UE 102, the UE 102 will trust the malicious network or rogue access point 108 and will be vulnerable to other attacks, loss of the UE user's data, damage to the UE 102, and the like.

Thus, described and illustrated herein are systems, devices, methods, and computer programs for preventing DoS attacks for a UE 102 receiving a REJECT MESSAGE 112 without integrity protection from the fake access point 108. In some embodiments, when the UE 102 receives the REJECT MESSAGE 112 without integrity protection, the UE 102 starts a timer and acts depending on the corresponding counter values, the received 5GMM reject cause value(s) and the access type (e.g., 3GPP or non-3GPP access). In some embodiments, the existing timer, T3247, can be reused for this purpose.

In some embodiments, as opposed to the approach for validation of a USIM for a non-public network 104 (e.g., SNPN 104), for each of the entries in the "list of subscriber data" stored at the UE 102, the UE 102 maintains one counter for "the entry for the current SNPN considered invalid for 3GPP access" events and one counter for "the entry for the current SNPN considered invalid for non-3GPP access" events. Thus, in some embodiments, the validity of the subscription information is managed for each and every non-public network 104 (e.g., SNPN 104) separately. In the case of PLMNs and the conventional approaches for preventing such DoS attacks on UEs 102 attempting to register with a PLMN, the UE 102 is configured to use only a single counter for "SIM/USIM considered invalid for GPRS services" events and a single counter for "SIM/USIM considered invalid for 5GS services over non-3GPP access" events. As such, according to conventional practice for PLMNs, once the subscription information in the USIM is considered invalid for one PLMN, the subscription information in the USIM is considered invalid for other PLMNs as well. Conversely, according to the approach described herein and in the claims, a UE 102 can invalidate the USIM for a particular non-public network 104 (e.g., SNPN 104) without invalidating the USIM for other non-public networks.

In some embodiments, when an entry of the "list of subscriber data" is reconfigured or removed, if the SNPN-specific attempt counter for 3GPP access for the SNPN 104 corresponding to the entry has a value greater than zero and less than a UE implementation-specific maximum value, the UE 102 shall remove the SNPN identity corresponding to the entry from the "permanently forbidden SNPNs" list. In some embodiments, if the SNPN-specific attempt counter for non-3GPP access for the SNPN 104 corresponding to the entry has a value greater than zero and less than the UE implementation-specific maximum value, the UE 102 shall remove the SNPN identity corresponding to the entry from the "permanently forbidden SNPNs" list for non-3GPP access.

In case of the conventional approaches for preventing DoS attacks for UEs attempting to connect to a PLMN, when the USIM is removed or otherwise reset, the UE 102 shall, for each PLMN-specific attempt counter that has a value greater than zero and less than the UE implementation-specific maximum value, remove the respective PLMN from the forbidden PLMN list and the UE shall, for each PLMN-specific attempt counter for non-3GPP access that has a value greater than zero and less than the UE implementation-specific maximum value, remove the respective PLMN from the forbidden PLMN list for non-3GPP access.

In addition, as discussed in greater detail below, the EU 102, in response to receiving the REJECT MESSAGE 112 and determining that the REJECT MESSAGE 112 is not integrity protected, in that there is no NAS security provided, such as the ciphering of NAS signaling messages, which can act as security parameters for authentication. Under the 3GPP protocol, integrity protection and ciphering can be tied together in an EPS security context (established between the UE 102 and MME) and identified by a key set identifier. As such, it is often not possible to establish an EPS security context between the UE 102 and a SNPN 104. In the context of a PLMN, the EU 102 could communicate with the PLMN in MICO mode, meaning that a REJECT MESSAGE 112 received from a PLMN is likely received with integrity protection and ciphering. Conversely, since the authentication information and identity information for each SNPN 104 is different, the UE 102 cannot form a secure or quasi-secure channel of communication with the SNPN 104 for purposes of the SNPN 104 sending a REJECT MESSAGE 112 with integrity protection and ciphering.

As such, the UE 102 can be configured to adhere to a protocol by which a random value is selected from among a pre-approved range of values, the values being associated with a wait time 114, the duration of which the UE 102 shall wait before sending a further control message to the SNPN 104 or an access point 106 thereof. If, after the wait timer 114, the UE 102 determines that the counter is not above a UE approved threshold for the particular network type (e.g., public versus non-public) and connection type (e.g., 3GPP versus non-3GPP) for which the UE 102 is requesting registration, then the control message is re-sent to the access point 106 requesting registration with the network 104.

Once the network 104 and/or the real access point 106 is/are determined by the UE 102 as not likely being a rogue access point 108, the UE 102 can re-send the control message. Once the network 104 approves the UE 102 for registration with the network 104, the UE 102 can begin operating in CONNECTED mode, receiving services from services providers according to the service-based architecture (SBA) of the network 104 (e.g., the 5G SBA), and communicating with the network 104 and with internet 118 and/or other resources and services by way of the network 104.

Referring now to FIG. 2, a block diagram of an apparatus 202 is provided, in accordance with some example embodiments. The apparatus 202 may represent a user equipment, such as the user equipment 102. The apparatus 202, or portions therein, may be implemented in other network nodes including base stations access points 106/WLAN access points as well as other network equipment, or other portions of the SNPN 104 itself.

As illustrated, the apparatus 202 can include a processor 204 in communication with a memory 206 and configured to provide signals to and receive signals from a communication interface 208. In some embodiments, the communication interface 208 can include a transmitter and a receiver. In some embodiments, the processor 204 can be configured to control the functioning of the apparatus 202, at least in part. In some embodiments, the processor 204 may be configured to control the functioning of the transmitter and receiver by effecting control signalling via electrical leads to the transmitter and receiver. Likewise, the processor 204 may be configured to control other elements of apparatus 10 by effecting control signalling via electrical leads connecting the processor 204 to the other elements, such as a display or the memory 206. The processor 204 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 2 as a single processor, in some example embodiments the processor 20 may comprise a plurality of processors or processing cores.

The apparatus 202 may be capable of operating with one or more air interface standards, communication protocols, modulation types, access types, and/or the like. Signals sent and received by the processor 204 may include signalling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 202 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 202 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 202 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 202 may be capable of operating in accordance with 4G wireless communication protocols, such as LTE Advanced, 5G, and/or the like as well as similar wireless communication protocols that may be subsequently developed.

It is understood that the processor 204 may include circuitry for implementing audio/video and logic functions of the apparatus 202. For example, the processor 204 may comprise a digital signal processor device, a microprocessor device, an analog-to-digital converter, a digital-to-analog converter, and/or the like. Control and signal processing functions of the apparatus 202 may be allocated between these devices according to their respective capabilities. The processor 204 may additionally comprise an internal voice coder (VC) 20$a$, an internal data modem (DM) 20$b$, and/or the like. Further, the processor 204 may include functionality to operate one or more software programs, which may be stored in memory 206. In general, the processor 204 and software instructions stored in memory 206 may be configured to cause apparatus 202 to perform actions. For example, the processor 204 may be capable of operating a connectivity program, such as a web browser. The connectivity program may allow the apparatus 202 to transmit and receive web content, such as location-based content, according to a protocol, such as wireless application protocol, WAP, hypertext transfer protocol, HTTP, and/or the like.

Apparatus 202 may also comprise a user interface including, for example, an earphone or speaker, a ringer, a microphone, a display, a user input interface, and/or the like, which may be operationally coupled to the processor 204. The display may, as noted above, include a touch sensitive display, where a user may touch and/or gesture to make selections, enter values, and/or the like. The processor 204 may also include user interface circuitry configured to control at least some functions of one or more elements of the user interface, such as the speaker, the ringer, the microphone, the display, and/or the like. The processor 204 and/or user interface circuitry comprising the processor 204 may be configured to control one or more functions of one or more elements of the user interface through computer program instructions, for example, software and/or firmware, stored on the memory 206 accessible to the processor 204, for example, a volatile memory, a non-volatile memory, devices comprising the same, and/or the like. The apparatus 202 may include a battery for powering various circuits related to the mobile terminal, for example, a circuit to provide mechanical vibration as a detectable output. The user input interface may comprise devices allowing the apparatus 202 to receive data, such as a keypad (e.g., a virtual keyboard presented on a display or an externally coupled keyboard) and/or the like.

As shown in FIG. 2, apparatus 202 may also include one or more mechanisms for sharing and/or obtaining data, illustrated as the communication interface 208. For example, the communication interface 208 of the apparatus 202 may include a short-range radio frequency (RF) transceiver and/or interrogator, so data may be shared with and/or obtained from electronic devices in accordance with RF techniques. The apparatus 202 may include other short-range transceivers, such as an infrared (IR) transceiver, a Bluetooth™ (BT) transceiver operating using Bluetooth™ wireless technology, a wireless universal serial bus (USB) transceiver, a Bluetooth™ Low Energy transceiver, a ZigBee transceiver, an ANT transceiver, a cellular device-to-device transceiver, a wireless local area link transceiver, and/or any other short-range radio technology. Apparatus 202 and, in particular, the short-range transceiver may be capable of transmitting data to and/or receiving data from electronic devices within the proximity of the apparatus, such as within about 10 meters, for example. The apparatus 202 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 202 may comprise other memory, such as a subscriber identity module (SIM), a removable user identity module (R-UIM), an eUICC, an UICC, and/or the like, which may store information elements related to a mobile subscriber. In addition to the SIM, the apparatus 202 may include other removable and/or fixed memory. The apparatus 202 may include volatile memory and/or non-volatile memory, which can comprise some or all of the memory 206 or can alternatively be a separate memory within or connected to the apparatus 202. For example, volatile memory may include Random Access Memory (RAM) including dynamic and/or static RAM, on-chip or off-chip cache memory, and/or the like. Non-volatile memory, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory, non-volatile memory may include a cache area for temporary storage of data. At least part of the volatile and/or non-volatile memory may be embedded in processor 204. The memories may store one or more software programs, instructions, pieces of information, data, and/or the like which may be used by the apparatus for performing operations disclosed herein. Alternatively or additionally, the apparatus 202 may be configured to cause operations disclosed herein with respect to base stations 106/WLAN access points 106 and network nodes including the UEs 102.

The memories may comprise an identifier, such as an international mobile equipment identification (IMEI) code, capable of uniquely identifying apparatus 202. The memories may comprise an identifier, such as an international mobile equipment identification (IMEI) code, capable of uniquely identifying apparatus 202. In the example embodiment, the processor 204 may be configured using computer code stored at memory and/or to the provide operations disclosed herein with respect to the base stations 106/WLAN access points 106 and network nodes including the UEs 102. Likewise, the apparatus 202 can be configured to be any other component or network equipment from the SNPN 104.

Some of the embodiments disclosed herein may be implemented in software, hardware, application logic, or a combination of software, hardware, and application logic. The software, application logic, and/or hardware may reside on memory 206, the control apparatus 204, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 2, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be improved UE configuration. References hereinbelow to "UE 102" are understood to apply and refer also to "apparatus 202." As such, any embodiment of a method, system, approach, device, apparatus, or computer program described or illustrated herein is understood to comprise any or all of the components, functionalities, elements, or steps of any other embodiment such that any method can be carried out by the UE 102, by the apparatus 202, or by any other suitable system or device, and likewise can be carried out according to a computer program code envisioned within the scope of this disclosure.

In some embodiments, the UE 102 can be configured to operate in SNPN access mode, in which mode the UE 102 is configured to request, establish, and maintain access, connections, channels of communication, and avenues for service provisioning with network equipment and network entities.

In some embodiments, if the UE 102 is operating in SNPN access mode, the UE 102 shall maintain, for each of the entries in the "list of subscriber data" at least one of the following counters:

a) one SNPN-specific attempt counter for 3GPP type access, the counter being configured to count access attempts via 3GPP access only;
b) one SNPN-specific attempt counter for non-3GPP type access, the counter being configured to count access attempts via non-3GPP access only;
c) one counter for "the entry of the current SNPN is considered invalid for 3GPP access" events, and
d) one counter for "the entry for the current SNPN is considered invalid for non-3GPP access" events.

In some embodiments, the UE 102 can or shall store the above counters in its non-volatile memory. In some embodiments, the UE 102 shall erase the attempt counters and reset the event counters to zero when the entry of the "list of subscriber data" with the corresponding SNPN identity is reconfigured or removed. In some embodiments, the counter values shall not be affected by the activation or deactivation of MICO mode or power saving mode (See, e.g., 3GPP TS 24.301).

In some embodiments, the UE implementation-specific maximum value for any of the above counters shall not be greater than 10. In some embodiments, different counters can use different UE implementation-specific maximum values. In other words, in some embodiments, the UE implementation-specific maximum value can be different between different network types (e.g., PLMN, SNPN) and/or between different access protocols (e.g., 3GPP, non-3GPP).

In some embodiments, if the UE 102 receives a rejection message from a network (sometimes called a reject message), such as after sending a request for registration or a request for provisioning of a service to the UE 102, the UE 102 can evaluate the rejection message to determine whether to trust the message is from a reputable network, determine why the rejection message was received, and/or determine whether another similar and/or a different message can be sent to the network with regard to the registration or service request. For instance, in the context of 5G networks, if the UE 102 receives a REGISTRATION REJECT or SERVICE REJECT message without integrity protection with one or more of select 5GMM cause value, e.g., #3, #6, #12, #15, #72, #74, or #75, before the network 104 has established secure exchange of NAS messages for the N1 NAS signaling connection, the UE 102 shall start a timer T3247 (See, e.g., 3GPP TS 24.008) with a random value uniformly drawn from the range between two predetermined wait time values, e.g., 30 minutes and 60 minutes, if the timer is not running, and take the following actions:

A) if the 5GMM cause value received is #3 or #6:
  a. if the 5GMM cause value is received over 3GPP access and:
    i. if the counter for "the entry for the current SNPN considered invalid for 3GPP access" events has a value less than a UE implementation-specific maximum value, the UE 102 can or shall:
      set the 5GS update status to 5U3 ROAMING NOT ALLOWED (and shall store it) and shall delete the 5G Globally Unique Temporary Identity (5G-GUTI), last visited registered tracking area identity (TAI), TAI list, and key set identifier (ngKSI) for 3GPP access;
      increment the counter for "the entry for the current SNPN considered invalid for 3GPP access" events;
      reset the registration attempt counter in case of a REGISTRATION REJECT message;
      store the current TAI in the list of "5GS forbidden tracking areas for roaming" for the current SNPN and enter the state 5GMM-DEREGISTERED.LIMITED-SERVICE; and
      search for a suitable cell in another tracking area according to 3GPP TS 38.304 or 3GPP TS 36.304. As a UE implementation option, if non-3GPP access is available, the UE is not registered to the current SNPN over non-3GPP access yet, and the entry of the "list of subscriber data" with the SNPN identity of the current SNPN is not considered invalid for non-3GPP access, then the UE may make a registration attempt over non-3GPP access; or
    ii. Otherwise, the UE 102 can or shall proceed as if the message is integrity protected;
  b. if the 5GMM cause value is received over non-3GPP access and:
    i. if the counter for "the entry for the current SNPN considered invalid for non-3GPP access" events has a value less than a UE implementation-specific maximum value, the UE 102 shall:
      set the 5GS update status to 5U3 ROAMING NOT ALLOWED (and shall store it) and shall delete the 5G-GUTI, last visited registered TAI, TAI list, and ngKSI for non-3GPP access;
      enter the state 5GMM-DEREGISTERED LIMITED-SERVICE; and
      increment the counter for "the entry for the current SNPN considered invalid for non-3GPP access" events by one value. As a UE implementation option:
        a. if another access point for non-3GPP access is available, the UE may make a registration attempt over non-3GPP access to the other access point (the UE may select another non-3GPP access point based on a UE implementation-specific means); or
        b. if 3GPP access is available, the UE is not registered to the current SNPN over 3GPP access yet, and the entry of the "list of subscriber data" with the SNPN identify of the current SNPN is not considered invalid for 3GPP access, then the UE may make a registration attempt over 3GPP access to the same network for which non-3GPP access was not allowed; or
    ii. otherwise, the UE 102 shall proceed as if the message is integrity protected;
B) if the 5GMM cause value received is #12 or #15, the UE 102 shall proceed as if the message is integrity protected. Additionally:
  1) if the 5GMM cause value is received over 3GPP access, non-3GPP access is available, the UE is not registered to the current SNPN over non-3GPP access yet, and the entry of the "list of subscriber data" with the SNPN identity of the current SNPN is not yet considered invalid for non-3GPP access, the UE 102 may make a registration attempt over non-3GPP access to the current SNPN; or
  2) if the 5GMM cause value is received over non-3GPP access, 3GPP access is available, the UE 102 is not registered to the current SNPN over 3GPP access yet, and the entry of the "list of subscriber data" within the SNPN identity of the current SNPN is not considered invalid for 3GPP access, the UE 102 may make a registration attempt over the 3GPP access to the current SNPN;

C) if the 5GMM cause value received is #72, the UE shall proceed as if the message is integrity protected. Additionally, if the SNPN-specific attempt counter for non-3GPP access for the current SNPN has a value less than a UE implementation-specific maximum value, the UE shall increment this counter; and D) if the 5GMM cause value received is #74 or #75:
1) if the 5GMM cause value is received over 3GPP access, the UE 102 shall:
   a. set the 5GS update status to 5U3 ROAMING NOT ALLOWED (and store it) and shall delete the 5G-GUTI, last visited registered TAI, TAI list, and ngKSI for 3GPP access;
   b. reset the registration attempt counter in case of a REGISTRATION REJECT message;
   c. store the current TAI in the list of "5GS forbidden tracking areas for roaming" for the current SNPN and enter the state 5GMM-DEREGISTERED LIMITED-SERVICE; and
   d. search for a suitable cell in another tracking area according to 3GPP TS 38.304 or 3GPP TS 36.304. As a UE implementation option, if non-3GPP access is available, the UE 102 is not registered to the current SNPN over non-3GPP access yet, and the entry of the "list of subscriber data" with the SNPN identity of the current SNPN is not considered invalid for non-3GPP access, then the UE 102 may make a registration attempt over non-3GPP access to the current SNPN; and
2) if the 5GMM cause value is received over non-3GPP access, the UE 102 shall:
   a. set the 5GS update status to 5U3 ROAMING NOT ALLOWED (and shall store it) and shall delete the 5G-GUTI, last visited registered TAI, TAI list, and ngKSI for non-3GPP access;
   b. reset the registration attempt counter in case of a REGISTRATION REJECT message; and
   c. enter the state 5GMM-DEREGISTERED LIMITED-SERVICE. As a UE implementation option, if another access point for non-3GPP access is available, the UE 102 may make a registration attempt over non-3GPP access (the UE 102 may select another non-3GPP access point based on a UE implementation specific means) or, if 3GPP access is available, the UE 102 is not registered to the current SNPN over 3GPP access yet, and the entry of the "list of subscriber data" with the SNPN identity of the current SNPN is not considered invalid for 3GPP access, the UE 102 may make a registration attempt over the 3GPP access.

In some embodiments, upon expiry of the timer T3247, the UE 102 can or shall:
a. erase, for the current SNPN, the list of "5GS forbidden tracking areas for regional provision of service" and the list of "5GS forbidden tracking areas for roaming";
b. set the entry of the "list of subscriber data" with the SNPN identity of the current SNPN to valid for 3GPP access, if the counter for "the entry for the current SNPN considered invalid for 3GPP access" events has a value less than a UE implementation-specific maximum value;
c. set the entry of the "list of subscriber data" within the SNPN identity of the current SNPN to valid for non-3GPP access, if the counter for "the entry for the current SNPN invalid for non-3GPP access" events has a value less than a UE implementation-specific maximum value;
d. remove the SNPN identity of the current SNPN from the "permanently forbidden SNPNs" list and/or the "temporarily forbidden SNPNs" list, if the SNPN-specific attempt counter for 3GPP access for the current SNPN has a value greater than zero and less than a UE implementation-specific maximum value and the SNPN identity of the current SNPN is included in any of the "permanently forbidden SNPNs" list and/or the "temporarily forbidden SNPNs" list;
e. remove the SNPN identity of the current SNPN from the "permanently forbidden SNPNs" list for non-3GPP access and/or the "temporarily forbidden SNPNs" list for non-3GPP access, if the SNPN-specific attempt counter for non-3GPP access has a value greater than zero but less than a UE implementation-specific maximum value and the SNPN identity of the current SNPN is included in any of the "permanently forbidden SNPNs" list for non-3GPP access and/or the "temporarily forbidden SNPNs" list for non-3GPP access;
f. initiate a registration procedure, if still needed, dependent on 5GMM state and 5GS update status, or perform SNPN selection, See, e.g., 3GPP TS 23.122.

When the UE 102 is switched off:
a. for each SNPN-specific attempt counter for 3GPP access having a value greater than zero and less than the UE implementation-specific maximum value, the UE 102 shall remove the respective SNPN identity from the "permanently forbidden SNPNs" list and/or the "temporarily forbidden SNPNs" list, if available; and
b. for each SNPN-specific attempt counter for non-3GPP access having a value greater than zero and less than the UE implementation-specific maximum value, the UE 102 shall remove the respective SNPN identity from the "permanently forbidden SNPNs" list and/or the "temporarily forbidden SNPNs" list, if available.

When an entry of the "list of subscriber data" is reconfigured or removed:
a. if the SNPN-specific attempt counter for 3GPP access for the SNPN corresponding to the entry has a value grater than zero and less than the UE implementation-specific maximum value, the UE shall remove the SNPN identity corresponding to the entry from the "permanently forbidden SNPNs" list and/or the "temporarily forbidden SNPNs" list, if available; and
b. if the SNPN-specific attempt counter for non-3GPP access for the SNPN corresponding to the entry has a value greater than zero and less than the UE implementation-specific maximum value, the UE shall remove the SNPN identity corresponding to the entry from the "permanently forbidden SNPNs" list for non-3GPP access and/or the "temporarily forbidden SNPNs" list for non-3GPP access, if available.

Figure 3:
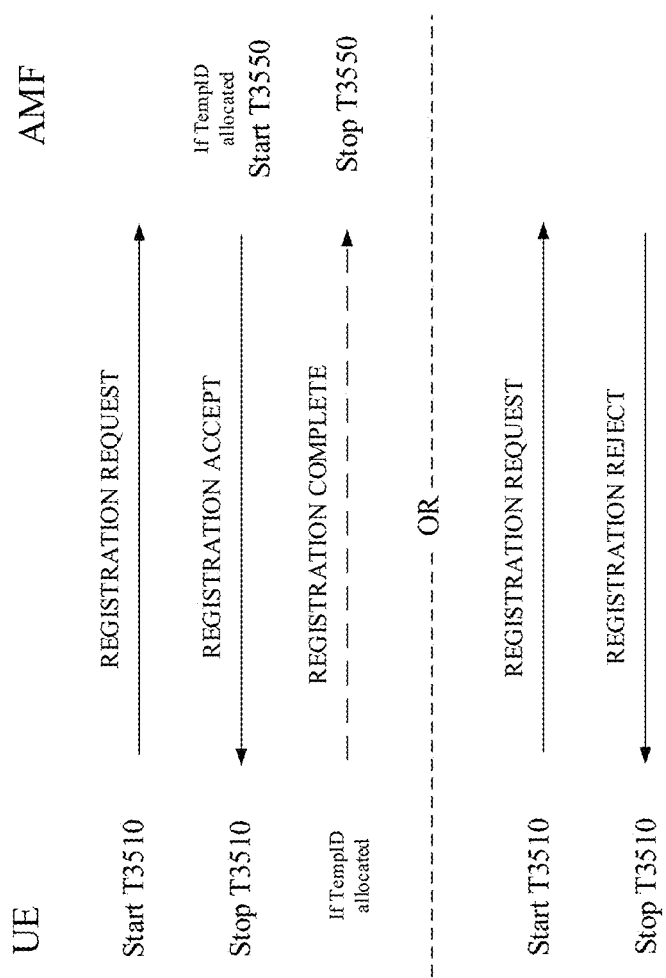
FIG. 3 depicts an example of a process flow for a UE requesting registration with a network, in accordance with some example embodiments.

Referring now to FIG. 3, FIG. 3 illustrates, according to a particular embodiment of the present disclosure, a message protocol chart of a UE 102 making a REGISTRATION REQUEST to an Access Mobility Function (AMF) of the network 104, which can be a component of the base station 106 or accessible thereby. At the time that the UE 102 sends the REGISTRATION REQUEST message to the AMF, the UE 102 starts a T3510 timer. The AMF thereafter receives the REGISTRATION REQUEST message and determines whether the UE 102 can be registered with the network 104 according to the REGISTRATION REQUEST. In an instance in which the AMF can register the UE 102 with the network 104, the AMF carries out authorization of the UE 102 with the network 104. If the AMF allocates a TempID for the request, the AMF starts a T3550 timer upon receipt of the REGISTRATION REQUEST and transmits back to the UE 102 a REGISTRATION ACCEPT message. When the UE 102 receives the REGISTRATION ACCEPT message the UE 102 stops the T3510 timer. If a TempID was allocated by the AMF, the UE 102 sends a REGISTRATION COMPLETE message back to the AMF. Upon receiving the REGISTRATION COMPLETE message, the AMF then stops the T3550 timer. Conversely, as illustrated at the bottom of the message chart, in an instance in which the AMF determines that the UE 102 cannot be registered with the network 104, the AMF does not start a timer and simply responds to the REGISTRATION REQUEST message by sending back to the UE 102 a REGISTRATION REJECT message. Upon receiving the REGISTRATION REJECT message from the AMF, the UE 102 stops the T3510 timer and, depending on the network type and the access protocol, cause the counter to increase the count by one value.

In some embodiments, if the UE 102 receives the REGISTRATION ACCEPT message from an SNPN 104, then the UE 102 shall reset the SNPN-specific attempt counter for that SNPN 104 for the specific access type for which the message was received. If the message was received via 3GPP access, the UE 102 shall reset the counter for "the entry for the current SNPN considered invalid for 3GPP access" events. If the message was received via non-3GPP access, the UE 102 shall reset the counter for "the entry for the current SNPN considered invalid for non-3GPP access" events.

In some embodiments, the UE 102 can or shall take the following actions depending on the 5GMM cause value received in the REGISTRATION REJECT message:

3 (Illegal UE) or #6 (Illegal ME):
  a. The UE 102 shall set the 5GS update status to 5U3 ROAMING NOT ALLOWED (and shall store it) and shall delete any 5G-GUTI, last visited registered TAI, TAI list, and ngKSI. The UE 102 shall consider the entry of the "list of subscriber data" with the SNPN identity of the current SNPN 104 as invalid until the UE 102 is switched off or the entry is reconfigured or removed. The UE 102 shall enter the state 5GMM-DEREGISTERED. If the message has been successfully integrity checked by the NAS, then the UE 102 shall set the counter for "the entry for the current SNPN considered invalid for 3GPP access" events and to the UE implementation-specific maximum value for that particular counter and the counter for "the entry for the current SNPN considered invalid for non-3GPP access" to the UE implementation-specific maximum value for that particular counter.

72 (Non-3GPP access to 5GCN not allowed)
  a. When this cause value is provided in a REGISTRATION REJECT message received over non-3GPP access, the UE 102 shall set the 5GS update status to 5U3 ROAMING NOT ALLOWED (and shall store it) and shall delete the 5G-GUTI, last visited registered TAI, TAI list, and ngKSI. Additionally, the UE 102 shall reset the registration attempt counter and enter the state 5GMM-DEREGISTERED. If the message has been successfully integrity checked by the NAS, the UE 102 shall set the SNPN-specific attempt counter for non-3GPP access for that SNPN to the UE implementation-specific maximum value for that particular counter.

74 (Temporarily not authorized for this SNPN)
  a. 5GMM cause #74 is only applicable when received from a cell belonging to an SNPN. 5GMM cause #74 received from a cell not belonging to an SNPN is considered to be an abnormal case. In some embodiments, the UE 102 shall set the 5GS update status to 5U3 ROAMING NOT ALLOWED (and shall store it) and shall delete any 5G-GUTI, last visited registered TAI, TAI list, and ngKSI. The UE 102 shall reset the registration attempt counter and store the SNPN identity in the "temporarily forbidden SNPNs" list for the specific access type for which the message was received. The UE 102 shall enter the state 5GMM-DEREGISTERED PLMN-SEARCH and perform an SNPM selection, e.g., according to 3GPP TS 23.122. If the message has been successfully integrity checked by the NAS, the UE 102 shall set the SNPN-specific attempt counter for 3GPP access for that SNPN to the UE implementation-specific maximum value for that particular counter and the SNPN-specific attempt counter for non-3GPP access for that SNPN to the UE implementation-specific maximum value for that particular counter. If the message has been successfully integrity checked by the NAS and the UE 102 also supports the registration procedure over the other access to the same SNPN, the UE 102 shall in addition handle 5GMM parameters and 5GMM state for this access, as described for this 5GMM cause value.

75 (Permanently not authorized for this SNPN)
  a. 5GMM cause #75 is only applicable when received from a cell belonging to an SNPN. 5GMM cause #75 received from a cell not belonging to an SNPN is considered as an abnormal case. The UE 102 shall set the 5GS update status to 5U3 ROAMING NOT ALLOWED (and shall store it) and shall delete any 5G-GUTI, last visited registered TAI, TAI list, and ngKSI. The UE 102 shall reset the registration attempt counter and store the SNPN identity in the "permanently forbidden SNPNs" list for the specific access type for which the message was received. The UE 102 shall enter state 5GMM-DEREGISTERED.PLMN-SEARCH and perform an SNPN selection, e.g., according to 3GPP TS 23.122. If the message has been successfully integrity checked by the NAS, the UE 102 shall set the SNPN-specific attempt counter for 3GPP access for that SNPN to the UE implementation-specific maximum value for that particular counter and the SNPN-specific attempt counter for non-3GPP access for that SNPN to the UE implementation-specific maximum value for that particular counter. If the message has been successfully integrity checked by the NAS and the UE 102 also supports the registration procedure over the other access to the same SNPN 104, the UE 102 shall in addition handle 5GMM parameters and 5GMM state for this access, as described for this 5GMM cause value.

Figure 4:
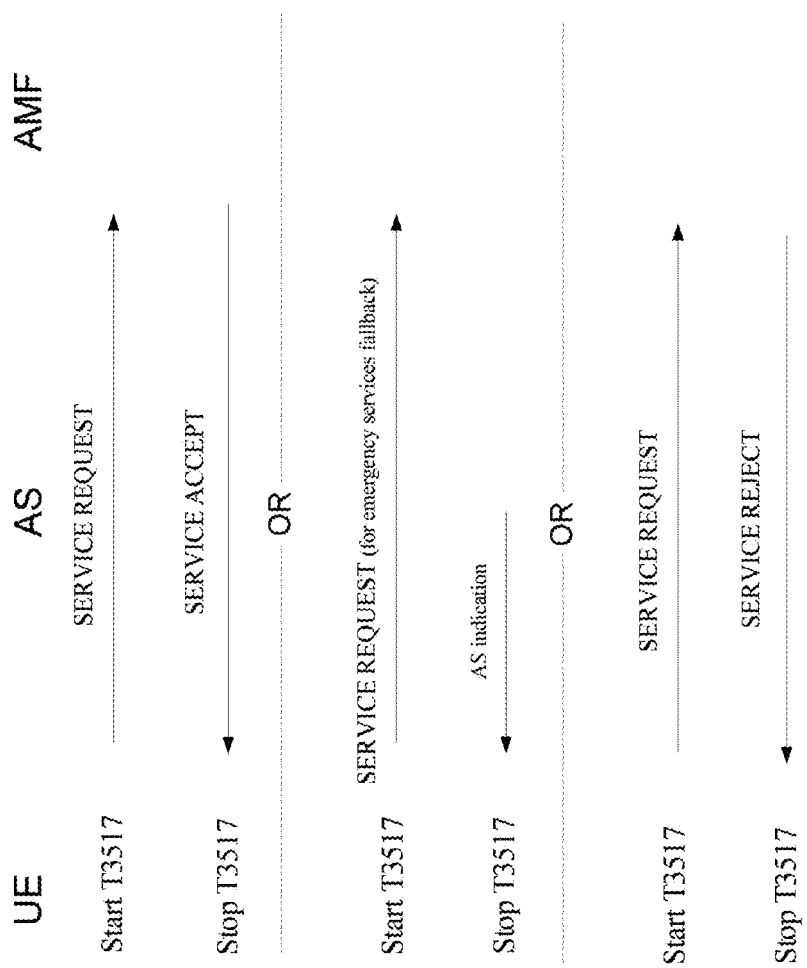
FIG. 4 depicts an example of a process flow for a UE requesting provisioning of a service from a network, in accordance with some example embodiments.

Referring now to FIG. 4, FIG. 4 illustrates, according to a particular embodiment of the present disclosure, a message protocol chart of a UE 102 making a SERVICE REQUEST via access strata (AS) signaling to an AMF of the network 104, which can be a component of the base station 106 or accessible thereby. At the time that the UE 102 sends the SERVICE REQUEST message to the AMF, the UE 102 starts a T3517 timer. The AMF thereafter receives the SERVICE REQUEST message and determines whether the service can be provisioned to the UE 102 according to the SERVICE REQUEST. In an instance in which the AMF can provide the service from the network 104 to the UE 102, the AMF carries out authorization of the UE 102 with the network 104 and relays the service to the network 104. In an instance in which the AMF can provision the service from the network 104 to the UE 102, the AMF sends a SERVICE ACCEPT message via AS signaling to the UE 102, and the UE 102 stops the T3517 timer. Conversely, in an instance in which the UE 102 sends a SERVICE REQUEST message for emergency services fallback, the network 104 or AMF may return an AS indication and the UE 102 can stop the T3517 timer. Alternatively, if the UE 102 sends a SERVICE REQUEST message via AS signalling to the AMF, and the AMF determines the network 104 cannot provision the requested service to the UE 102, the AMF transmits a SERVICE REJECT message to the UE 102, and the UE 102 stops the T3517 timer.

In some embodiments, the UE 102 can or shall take the following actions depending on the 5GMM cause value received in the SERVICE REJECT message:

3 (Illegal UE) and #6 (Illegal ME):
 a. The UE 102 shall set the 5GS update status to 5U3 ROAMING NOT ALLOWED (and shall store it) and shall delete any 5G-GUTI, last visited registered TAI, TAI list and ngKSI. The UE shall consider the entry of the "list of subscriber data" with the SNPN identity of the current SNPN as invalid until the UE is switched off or the entry is reconfigured or removed. The UE shall enter the state 5GMM-DEREGISTERED. If the message has been successfully integrity checked by the NAS, then the UE shall set the counter for "the entry for the current SNPN considered invalid for 3GPP access" events and the counter for "the entry for the current SNPN considered invalid for non-3GPP access" to UE implementation-specific maximum value.

72 (Non-3GPP access to 5GCN not allowed):
 a. If the UE initiated the service request procedure over non-3GPP access, the UE shall set the 5GS update status to 5U3 ROAMING NOT ALLOWED (and shall store it) and shall delete 5G-GUTI, last visited registered TAI, TAI list and ngKSI for non-3GPP access. Additionally, the UE shall reset the registration attempt counter and enter the state 5GMM-DEREGISTERED for non-3GPP access. If the message has been successfully integrity checked by the NAS, the UE shall set the SNPN-specific attempt counter for non-3GPP access for that SNPN to the UE implementation-specific maximum value.

74 (Temporarily not authorized for this SNPN):
 a. 5GMM cause #74 is only applicable when received from a cell belonging to an SNPN. 5GMM cause #74 received from a cell not belonging to an SNPN is considered as an abnormal case. The UE shall set the 5GS update status to 5U3 ROAMING NOT ALLOWED (and shall store it) and shall delete any 5G-GUTI, last visited registered TAI, TAI list and ngKSI. The UE shall reset the registration attempt counter and store the SNPN identity in the "temporarily forbidden SNPNs" list for the specific access type for which the message was received. The UE shall enter state 5GMM-DEREGISTERED.PLMN-SEARCH and perform an SNPN selection according to 3GPP TS 23.122. If the message has been successfully integrity checked by the NAS, the UE shall set the SNPN-specific attempt counter for 3GPP access and the SNPN-specific attempt counter for non-3GPP access for that SNPN to the UE implementation-specific maximum value. If the message has been successfully integrity checked by the NAS and the UE also supports the registration procedure over the other access to the same SNPN, the UE shall in addition handle 5GMM parameters and 5GMM state for this access, as described for this 5GMM cause value.

75 (Permanently not authorized for this SNPN):
 a. 5GMM cause #75 is only applicable when received from a cell belonging to an SNPN. 5GMM cause #75 received from a cell not belonging to an SNPN is considered as an abnormal case. The UE shall set the 5GS update status to 5U3 ROAMING NOT ALLOWED (and shall store it) and shall delete any 5G-GUTI, last visited registered TAI, TAI list and ngKSI. The UE shall reset the registration attempt counter and store the SNPN identity in the "permanently forbidden SNPNs" list for the specific access type for which the message was received. The UE shall enter state 5GMM-DEREGISTERED.PLMN-SEARCH and perform an SNPN selection according to 3GPP TS 23.122. If the message has been successfully integrity checked by the NAS, the UE shall set the SNPN-specific attempt counter for 3GPP access and the SNPN-specific attempt counter for non-3GPP access for that SNPN to the UE implementation-specific maximum value. If the message has been successfully integrity checked by the NAS and the UE also supports the registration procedure over the other access to the same SNPN, the UE shall in addition handle 5GMM parameters and 5GMM state for this access, as described for this 5GMM cause value.

In some embodiments, if a EAP-failure message is received in the AUTHENTICATION REJECT message:

1) if the message has been successfully integrity checked by the NAS:
 a. the UE shall set the update status to 5U3 ROAMING NOT ALLOWED, delete the stored 5G-GUTI, TAI list, last visited registered TAI and ngKSI. The entry of the "list of subscriber data" with the SNPN identity of the current SNPN shall be considered invalid until the UE is switched off or the entry is reconfigured or removed; and
 b. the UE shall set the counter for "the entry for the current SNPN considered invalid for 3GPP access" events and the counter for "the entry for the current SNPN considered invalid for non-3GPP access" events to UE implementation-specific maximum value; and 2) if the message is received without integrity protection, the UE shall start timer T3247 with a random value uniformly drawn from the range between 30 minutes and 60 minutes, if the timer is not running. Additionally, the UE shall:
 a. if the message is received over 3GPP access, and the counter for "the entry for the current SNPN considered invalid for 3GPP access" events has a value less than a UE implementation-specific maximum value, (if the UE is operating in SNPN access mode), maintain one SNPN-specific attempt counter for 3GPP type access, the counter being configured to count access attempts via 3GPP access for the case that the 5GMM cause value received is #3;
 b. if the message is received over non-3GPP access, and the counter for "the entry for the current SNPN considered invalid for non-3GPP access" events has a value less than a UE implementation-specific maximum value, (if the UE is operating in SNPN access mode), maintain one SNPN-specific attempt counter for non-3GPP type access, the counter being configured to count access attempts via non-3GPP access for the case that the 5GMM cause value received is #3;
c. otherwise:
  i. if the 5GMM cause value is received over 3GPP access, the UE shall:
    1. set the update status for 3GPP access to 5U3 ROAMING NOT ALLOWED, delete for 3GPP access only the stored 5G-GUTI, TAI list, last visited registered TAI and ngKSI. The entry of the "list of subscriber data" with the SNPN identity of the current SNPN shall be considered invalid for 3GPP access until the UE is switched off or the entry is reconfigured or removed.
    2. the UE shall set the counter for "the entry for the current SNPN considered invalid for 3GPP access" events to UE implementation-specific maximum value; and
  ii. if the 5GMM cause value is received over non-3GPP access, the UE shall:
    1. set the update status for non-3GPP access to 5U3 ROAMING NOT ALLOWED, delete for non-3GPP access only the stored 5G-GUTI, TAI list, last visited registered TAI and ngKSI. The entry of the "list of subscriber data" with the SNPN identity of the current SNPN shall be considered invalid for non-3GPP access until the UE is switched off or the entry is reconfigured or removed. The UE shall set the counter for "the entry for the current SNPN considered invalid for non-3GPP access" events to UE implementation-specific maximum value.

In some embodiments, upon receipt of an AUTHENTICATION REJECT message:
a. if the message has been successfully integrity checked by the NAS, the UE shall set the update status to 5U3 ROAMING NOT ALLOWED, delete the stored 5G-GUTI, TAI list, last visited registered TAI and ngKSI. The entry of the "list of subscriber data" with the SNPN identity of the current SNPN shall be considered invalid until the UE is switched off or the entry is reconfigured or removed.
  i. The UE shall set the counter for "the entry for the current SNPN considered invalid for 3GPP access" events and the counter for "the entry for the current SNPN considered invalid for non-3GPP access" events to UE implementation-specific maximum value.
b. if the message is received without integrity protection, the UE shall start timer T3247 with a random value uniformly drawn from the range between 30 minutes and 60 minutes, if the timer is not running. Additionally, the UE shall:
  i. if the message is received over 3GPP access, and the counter for "the entry for the current SNPN considered invalid for 3GPP access" events has a value less than a UE implementation-specific maximum value, (if the UE is operating in SNPN access mode), maintain one SNPN-specific attempt counter for 3GPP type access, the counter being configured to count access attempts via 3GPP access for the case that the 5GMM cause value received is #3;
  ii. if the message is received over non-3GPP access, and the counter for "the entry for the current SNPN considered invalid for non-3GPP access" events has a value less than a UE implementation-specific maximum value, (if the UE is operating in SNPN access mode), maintain one SNPN-specific attempt counter for non-3GPP type access, the counter being configured to count access attempts via non-3GPP access for the case that the 5GMM cause value received is #3.
  iii. otherwise:
    if the 5GMM cause value is received over 3GPP access, the UE 102 shall:
      a. set the update status for 3GPP access to 5U3 ROAMING NOT ALLOWED, delete for 3GPP access only the stored 5G-GUTI, TAI list, last visited registered TAI and ngKSI. The entry of the "list of subscriber data" with the SNPN identity of the current SNPN shall be considered invalid for 3GPP access until the UE is switched off or the entry is reconfigured or removed.
      b. The UE shall set the counter for "the entry for the current SNPN considered invalid for 3GPP access" events, to UE implementation-specific maximum value; and
    if the 5GMM cause value is received over non-3GPP access, the UE shall:
      a. set the update status for non-3GPP access to 5U3 ROAMING NOT ALLOWED, delete for non-3GPP access only the stored 5G-GUTI, TAI list, last visited registered TAI and ngKSI. The entry of the "list of subscriber data" with the SNPN identity of the current SNPN shall be considered invalid until the UE is switched off or the entry is reconfigured or removed.
      b. The UE shall set the counter for "the entry for the current SNPN considered invalid for non-3GPP access" events to UE implementation-specific maximum value.

While many of the embodiments described herein refer to a 5G system, it should be understood that other embodiments are contemplated and included within the scope of this disclosure that include or are configured to operate within other system types, such as a 4G system or the like.

Figure 5:
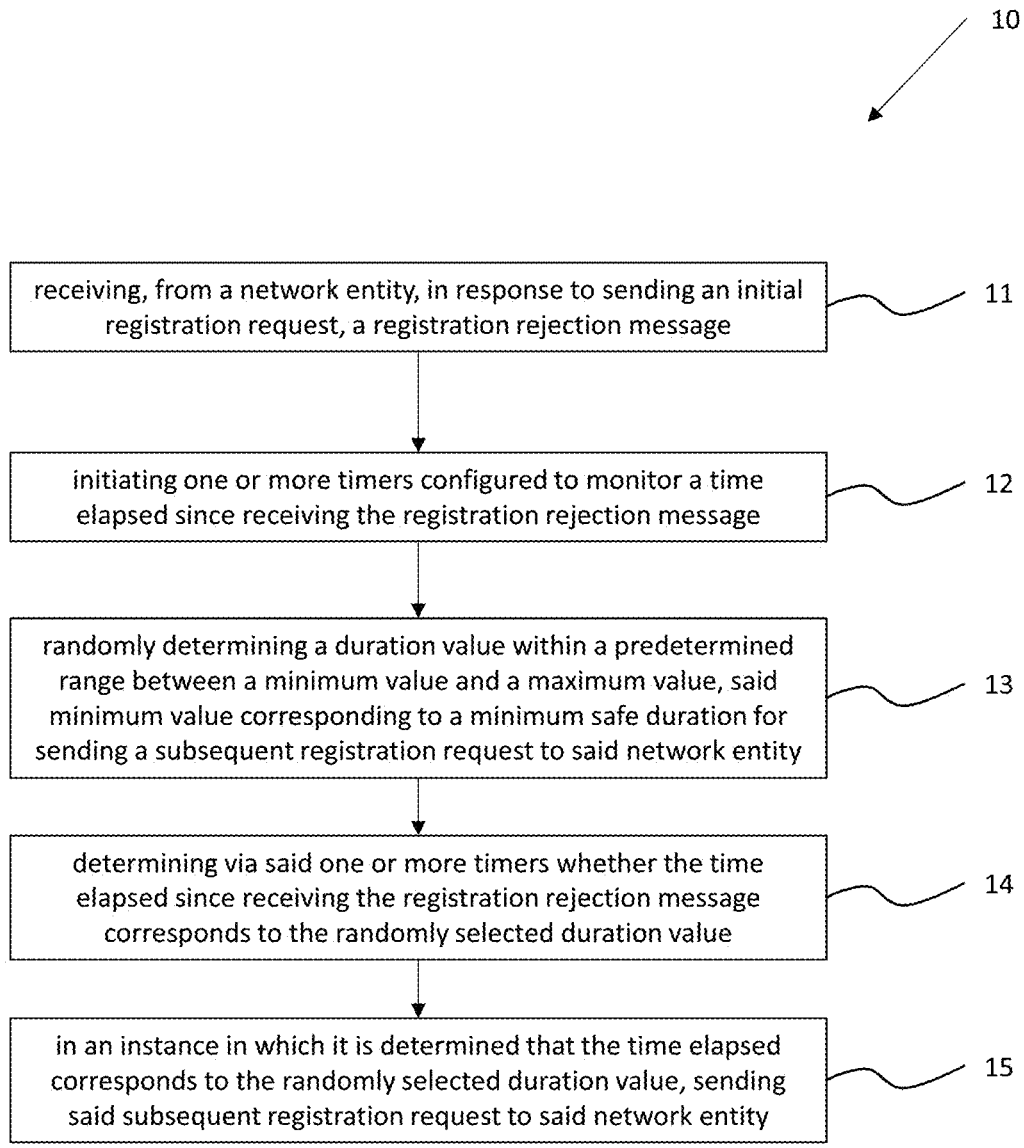
FIG. 5 depicts an example of a method for handling non-integrity protected reject messages in non-public networks, in accordance with some example embodiments.

Referring now to FIG. 5, a method 10 is provided for handling non-integrity protected reject messages in non-public networks. The method 10 can be carried out partially or in full by the UE 102, the apparatus 202, or any other suitable means. In some embodiments, the method can comprise: receiving, from a network entity, in response to sending an initial registration request, a registration rejection message, at 11. The method 10 can further comprise initiating one or more timers configured to monitor a time elapsed since receiving the registration rejection message, at 12. The method 10 can further comprise randomly determining a duration value within a predetermined range between a minimum value and a maximum value, the minimum value corresponding to a minimum safe duration for sending a subsequent registration request to the network entity, at 13. The method 10 can further comprise determining via the one or more timers whether the time elapsed since receiving the registration rejection message corresponds to the randomly selected duration value, at 14. The method 10 can further comprise, in an instance in which it is determined that the time elapsed corresponds to the randomly selected duration value, sending the subsequent registration request to the network entity, at 15.

In some embodiments, the registration rejection message can comprise a cause code indicating why the network entity is unable to register the apparatus. In some embodiments, the method can further comprise determining, based on at least the cause code, whether the registration rejection message is an integrity protected message. In some embodiments, the method 10 can further comprise, in an instance in which the registration rejection message is determined to be an integrity protected message, causing the subsequent registration request to be immediately sent to the network entity. In some embodiments, the method can further comprise sending the initial registration request to the network entity, the initial registration request comprising at least identifying information for the user equipment. In some embodiments, the one or more counters can be associated with entries of a list of subscriber data maintained by the apparatus. In some embodiments, the one or more counters can comprise a first counter associated with an entry of the list of subscriber data for a non-private network considered for network access events; and a second counter associated with an entry of the list of subscriber data for a private network considered for network access events.

In some embodiments, the list of subscriber data is a list of temporarily or permanently forbidden networks. In some embodiments, the method can further comprise, in an instance in which, upon expiry of the second counter, the second counter has a value greater than zero but less than the randomly selected duration value, removing the entry of the list of subscriber data for the private network from the list of temporarily or permanently forbidden networks.

Figure 6:
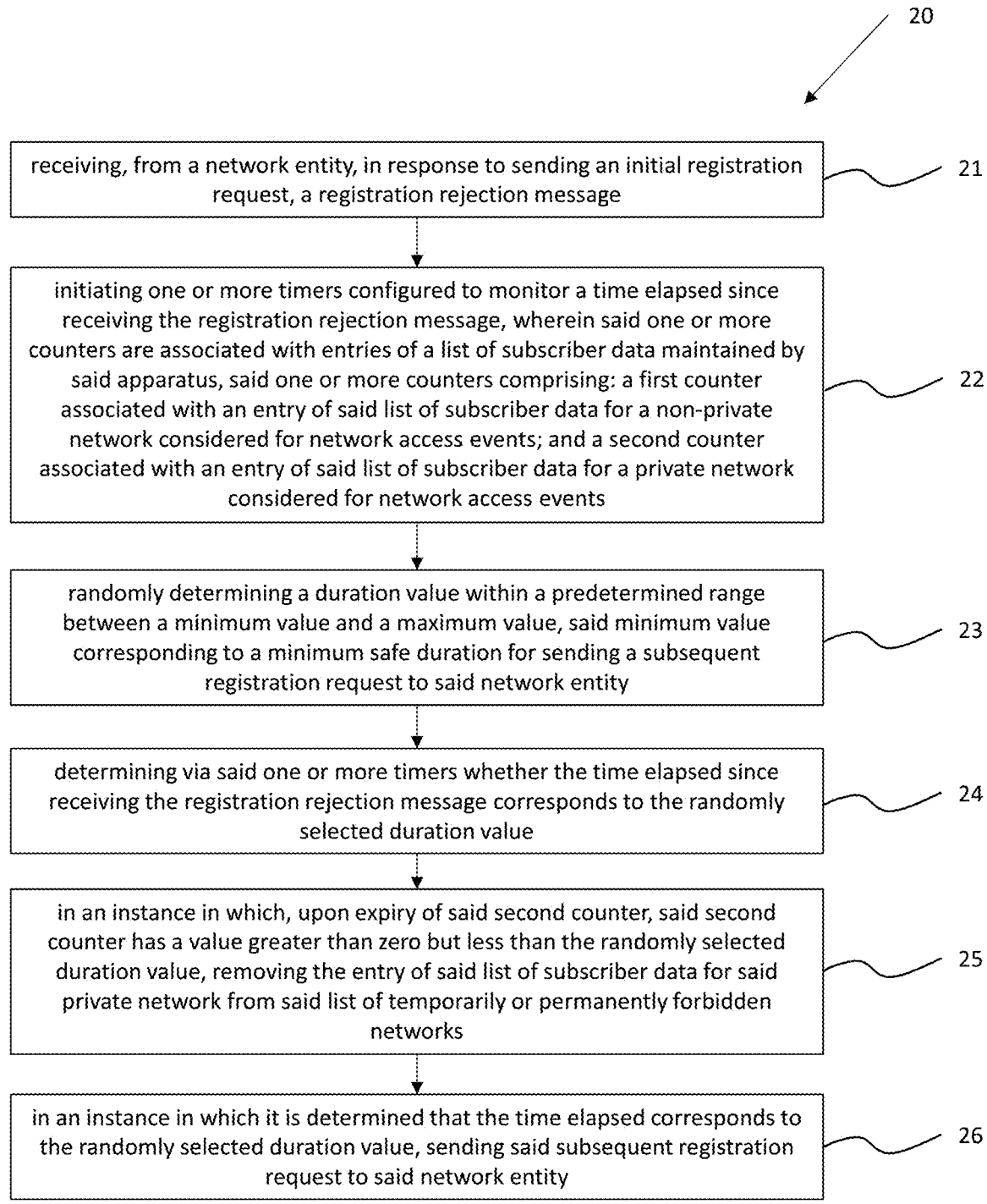
FIG. 6 depicts another example of a method for handling non-integrity protected reject messages in non-public networks, in accordance with some example embodiments.

Referring now to FIG. 6, a method 20 is provided for handling non-integrity protected reject messages in non-public networks. The method 20 can be carried out partially or in full by the UE 102, the apparatus 202, or any other suitable means. In some embodiments, the method 20 can comprise receiving, from a network entity, in response to sending an initial registration request, a registration rejection message, at 21. In some embodiments, the method 20 can further comprise initiating one or more timers configured to monitor a time elapsed since receiving the registration rejection message, wherein the one or more counters are associated with entries of a list of subscriber data maintained by the apparatus, the one or more counters comprising: a first counter associated with an entry of the list of subscriber data for a non-private network considered for network access events; and a second counter associated with an entry of the list of subscriber data for a private network considered for network access events, at 22. In some embodiments, the method 20 can further comprise randomly determining a duration value within a predetermined range between a minimum value and a maximum value, the minimum value corresponding to a minimum safe duration for sending a subsequent registration request to the network entity, at 23. In some embodiments, the method 20 can further comprise determining via the one or more timers whether the time elapsed since receiving the registration rejection message corresponds to the randomly selected duration value, at 24. In some embodiments, the method 20 can further comprise, in an instance in which, upon expiry of the second counter, the second counter has a value greater than zero but less than the randomly selected duration value, removing the entry of the list of subscriber data for the private network from the list of temporarily or permanently forbidden networks, at 25. In some embodiments, the method 20 can further comprise, in an instance in which it is determined that the time elapsed corresponds to the randomly selected duration value, sending the subsequent registration request to the network entity, at 26.

Figure 7:
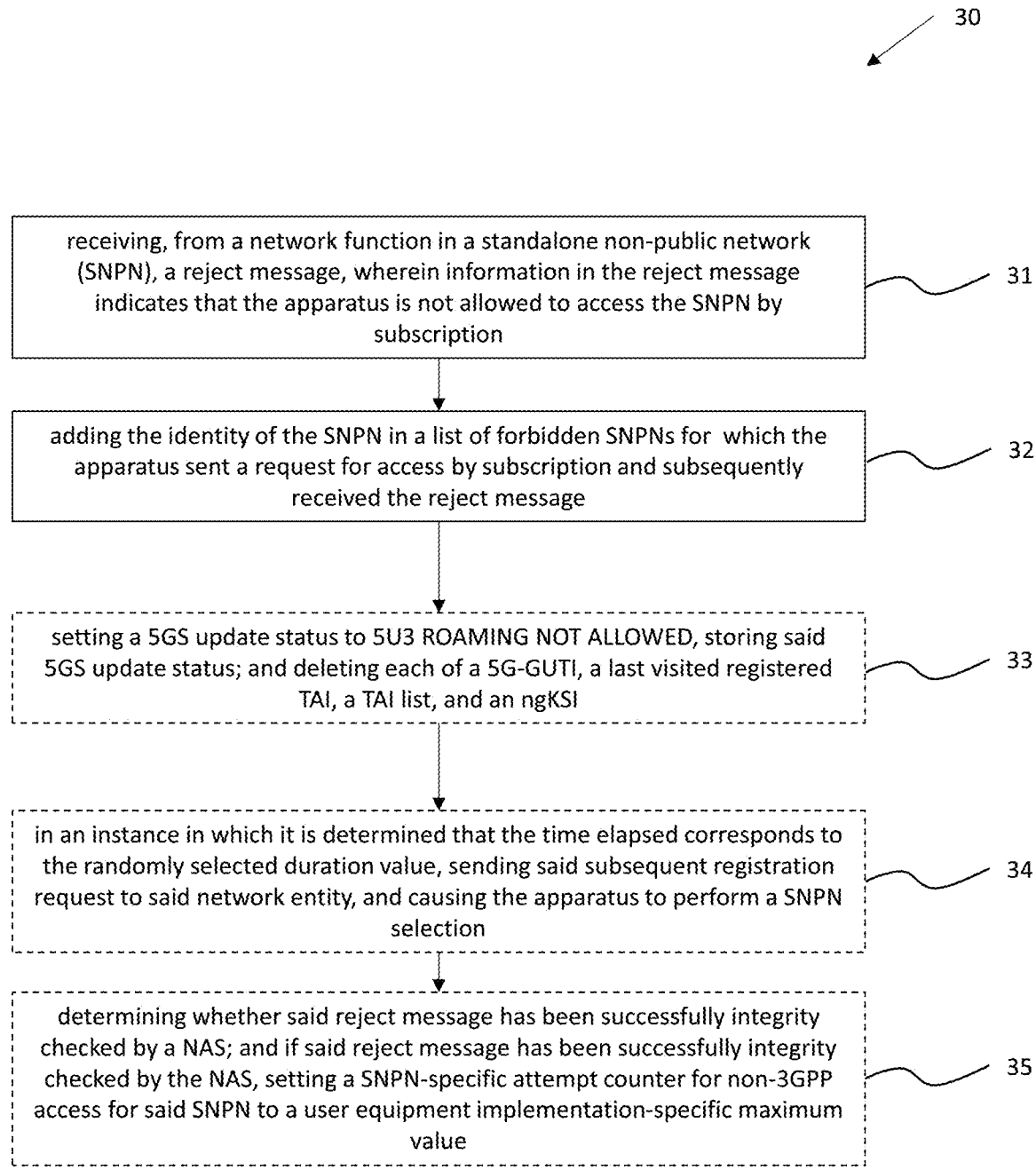
FIG. 7 depicts yet another example of a method for handling non-integrity protected reject messages in non-public networks, in accordance with some example embodiments.

Referring now to FIG. 7, a method 30 is provided for handling non-integrity protected reject messages in non-public networks. The method 30 can be carried out partially or in full by the UE 102, the apparatus 202, or any other suitable means. In some embodiments, the method 30 can comprise receiving, from a network function in a standalone non-public network (SNPN), a reject message, wherein information in the reject message indicates that the apparatus is not allowed to access the SNPN by subscription, at 31. In some embodiments, the method 30, can further comprise adding the identity of the SNPN in a list of forbidden SNPNs associated with an access via which the apparatus sent a request and subsequently received the reject message, at 32. In some embodiments, the method 30 can, optionally, further comprise setting a 5GS update status to 5U3 ROAMING NOT ALLOWED, storing the 5GS update status; and deleting each of a 5G-GUTI, a last visited registered TAI, a TAI list, and an ngKSI, at 33. In some embodiments, the method 30 can, optionally, further comprise in an instance in which it is determined that the time elapsed corresponds to the randomly selected duration value, sending the subsequent registration request to the network entity, and causing the apparatus to perform a SNPN selection, at 34. In some embodiments, the method 30 can, optionally, further comprise determining whether the reject message has been successfully integrity checked by a NAS; and if the reject message has been successfully integrity checked by the NAS, setting a SNPN-specific attempt counter for non-3GPP access for the SNPN to a user equipment implementation-specific maximum value, at 35.

Figure 8:
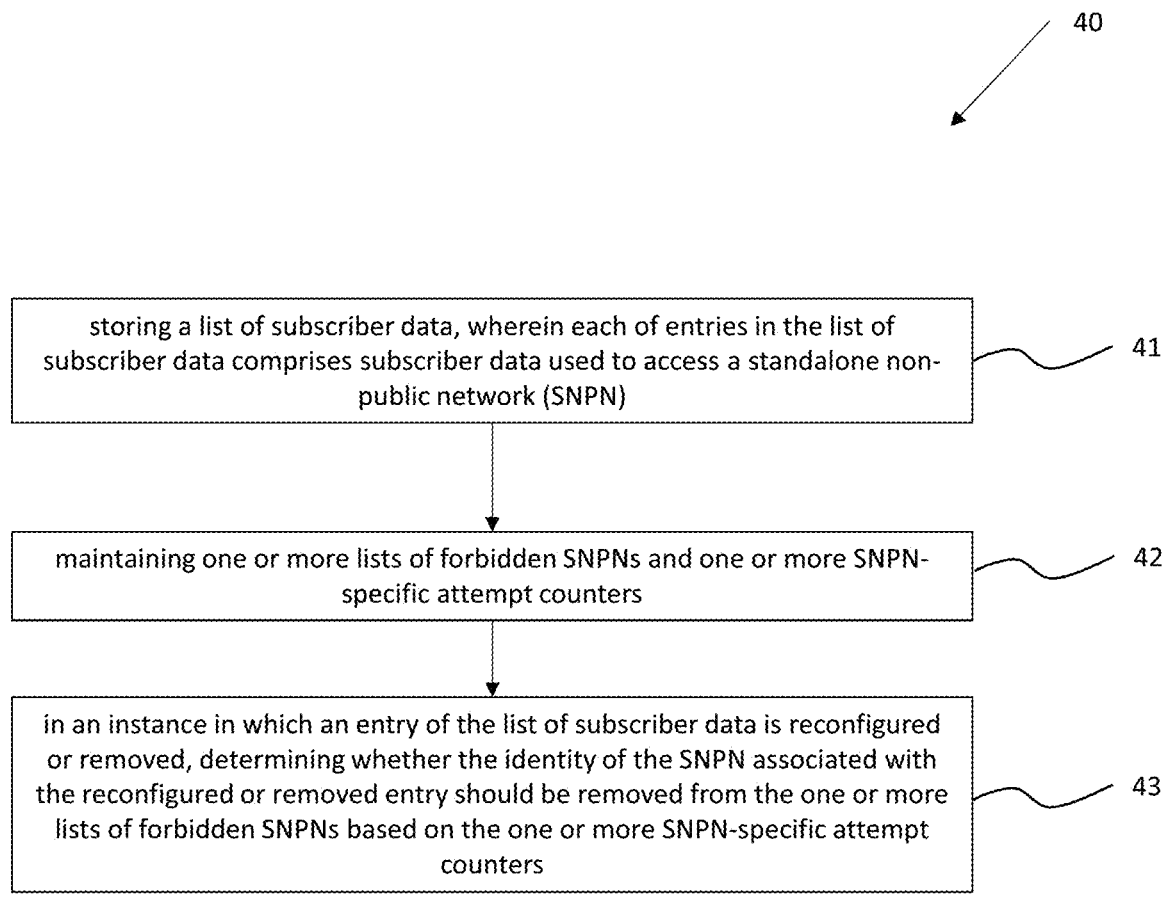
FIG. 8 depicts still another example of a method for handling non-integrity protected reject messages in non-public networks, in accordance with some example embodiments.

Referring now to FIG. 8, a method 40 is provided for handling non-integrity protected reject messages in non-public networks. The method 40 can be carried out partially or in full by the UE 102, the apparatus 202, or any other suitable means. In some embodiments, the method 40 can comprise storing a list of subscriber data, wherein each of entries in the list of subscriber data comprises subscriber data used to access a standalone non-public network (SNPN), at 41. In some embodiments, the method 40 can further comprise maintaining one or more lists of forbidden SNPNs and one or more SNPN-specific attempt counters, at 42. In some embodiments, the method 40 can further comprise in an instance in which an entry of the list of subscriber data is reconfigured or removed, determining whether the identity of the SNPN associated with the reconfigured or removed entry should be removed from the one or more lists of forbidden SNPNs based on the one or more SNPN-specific attempt counters, at 43.

Figure 9:
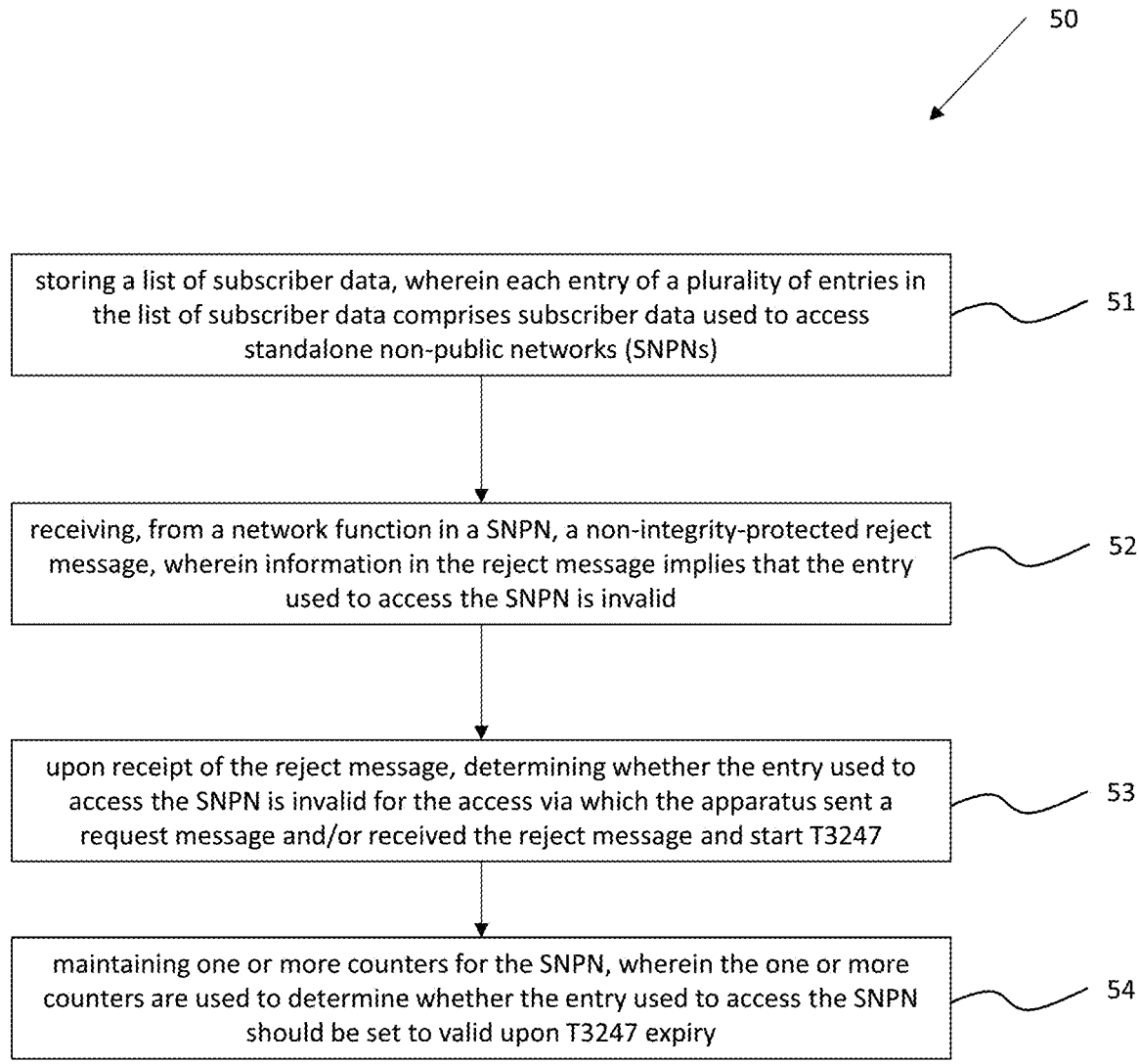
FIG. 9 depicts another example of a method for handling non-integrity protected reject messages in non-public networks, in accordance with some example embodiments.

Referring now to FIG. 9, a method 50 is provided for handling non-integrity protected reject messages in non-public networks. The method 50 can be carried out partially or in full by the UE 102, the apparatus 202, or any other suitable means. In some embodiments, the method 50 can comprise storing a list of subscriber data, wherein each entry of a plurality of entries in the list of subscriber data comprises subscriber data used to access standalone non-public networks (SNPNs), at 51. In some embodiments, the method 50 can further comprise receiving, from a network function in a SNPN, a non-integrity-protected reject message, wherein information in the reject message implies that the entry used to access the SNPN is invalid, at 52. In some embodiments, the method 50 can further comprise upon receipt of the reject message, considering that the entry used to access the SNPN is invalid for the access via which the apparatus sent a request message and/or received the reject message and start T3247, at 53. In some embodiments, the method 50 can further comprise maintaining one or more counters for the SNPN, wherein the one or more counters are used to determine whether the entry used to access the SNPN should be set to valid upon T3247 expiry, at 54.

As described herein, at least some embodiments are provided for methods, apparatuses, and computer program products for handling non-integrity protected reject messages in non-public networks.

In some example embodiments, there may be provided an apparatus including at least one processor and at least one memory including computer program code, the at least one memory and the computer program code configured to, with the at least one processor, cause the apparatus to at least: receive, from a network function in a standalone non-public network (SNPN), a reject message, wherein information in the reject message indicates that the apparatus is not allowed to access the SNPN by subscription; and add the identity of the SNPN in a list of forbidden SNPNs for which the apparatus sent a request for access by subscription and subsequently received the reject message. In some embodiments, the information in the reject message comprises a 5GMM cause value of #72, #74, or #75. In some embodiments, the at least one memory and the computer program code are further configured to, with the at least one processor, cause the apparatus to at least: set a 5GS update status to 5U3 ROAMING NOT ALLOWED; store the 5GS update status; and delete each of a 5G-GUTI, a last visited registered TAI, a TAI list, and an ngKSI. In some embodiments, the at least one memory and the computer program code are further configured to, with the at least one processor, cause the apparatus to at least: cause the apparatus to enter a state of 5GMM-DEREGISTERED or a state of 5GMM-DEREGISTERED.PLMN-SEARCH; and cause the apparatus to perform a SNPN selection. In some embodiments, the at least one memory and the computer program code are further configured to, with the at least one processor, cause the apparatus to at least: determine whether the reject message has been successfully integrity checked by a NAS; and, if the reject message has been successfully integrity checked by the NAS, set a SNPN-specific attempt counter for non-3GPP access for the SNPN to a user equipment implementation-specific maximum value. In some embodiments, the list of forbidden SNPNs is a permanently forbidden SNPNs list. In some embodiments, the list of forbidden SNPNs is a temporarily forbidden SNPNs list. In some embodiments, the list of forbidden SNPNs is a permanently forbidden SNPNs list for non-3GPP access. In some embodiments, the list of forbidden SNPNs is a temporarily forbidden SNPNs list for non-3GPP access.

In other example embodiments, there may be provided a method, such as a computer-implemented method, which may be implemented using, for instance, an apparatus such as described herein. In some embodiments, the method can comprise: receiving, from a network function in a standalone non-public network (SNPN), a reject message, wherein information in the reject message indicates that the apparatus is not allowed to access the SNPN by subscription; and adding the identity of the SNPN in a list of forbidden SNPNs for which the apparatus sent a request for access by subscription and subsequently received the reject message. In some embodiments, the information in the reject message comprises a 5GMM cause value of #72, #74, or #75. In some embodiments, the method can further comprise setting a 5GS update status to 5U3 ROAMING NOT ALLOWED; storing the 5GS update status; and deleting each of a 5G-GUTI, a last visited registered TAI, a TAI list, and an ngKSI. In some embodiments, the method can further comprise causing the apparatus to enter a state of 5GMM-DEREGISTERED or a state of 5GMM-DEREGISTERED.PLMN-SEARCH; and causing the apparatus to perform a SNPN selection. In some embodiments, the method can further comprise determining whether the reject message has been successfully integrity checked by a NAS; and, if the reject message has been successfully integrity checked by the NAS, setting a SNPN-specific attempt counter for non-3GPP access for the SNPN to a user equipment implementation-specific maximum value. In some embodiments, the list of forbidden SNPNs is a permanently forbidden SNPNs list. In some embodiments, the list of forbidden SNPNs is a temporarily forbidden SNPNs list. In some embodiments, the list of forbidden SNPNs is a permanently forbidden SNPNs list for non-3GPP access. In some embodiments, the list of forbidden SNPNs is a temporarily forbidden SNPNs list for non-3GPP access.

In other example embodiments, there may be provided an apparatus, such as an apparatus comprising at least one processor and at least one memory storing computer program code, which may be configured to implement methods such as described herein. In some embodiments, the apparatus can comprise means for receiving, from a network function in a standalone non-public network (SNPN), a reject message, wherein information in the reject message indicates that the apparatus is not allowed to access the SNPN by subscription. In some embodiments, the apparatus can comprise means for adding the identity of the SNPN in a list of forbidden SNPNs for which the apparatus sent a request for access by subscription and subsequently received the reject message. In some embodiments, the information in the reject message comprises a 5GMM cause value of #72, #74, or #75. In some embodiments, the apparatus can further comprise means for setting a 5GS update status to 5U3 ROAMING NOT ALLOWED; means for storing the 5GS update status; and means for deleting each of a 5G-GUTI, a last visited registered TAI, a TAI list, and an ngKSI. In some embodiments, the apparatus can further comprise means for causing the apparatus to enter a state of 5GMM-DEREGISTERED or a state of 5GMM-DEREGISTERED.PLMN-SEARCH; and means for causing the apparatus to perform a SNPN selection. In some embodiments, the apparatus can further comprise means for determining whether the reject message has been successfully integrity checked by a NAS; and means for, if the reject message has been successfully integrity checked by the NAS, setting a SNPN-specific attempt counter for non-3GPP access for the SNPN to a user equipment implementation-specific maximum value. In some embodiments, the list of forbidden SNPNs is a permanently forbidden SNPNs list. In some embodiments, the list of forbidden SNPNs is a temporarily forbidden SNPNs list. In some embodiments, the list of forbidden SNPNs is a permanently forbidden SNPNs list for non-3GPP access. In some embodiments, the list of forbidden SNPNs is a temporarily forbidden SNPNs list for non-3GPP access.

In other example embodiments, there may be provided a computer program product, such as a non-transitory computer readable medium including program code which, when executed, causes operations comprising: receiving, from a network function in a standalone non-public network (SNPN), a reject message, wherein information in the reject message indicates that the apparatus is not allowed to access the SNPN by subscription; and adding the identity of the SNPN in a list of forbidden SNPNs for which the apparatus sent a request for access by subscription and subsequently received the reject message. In some embodiments, the information in the reject message comprises a 5GMM cause value of #72, #74, or #75. In some embodiments, the program code causes further operations comprising: setting a 5GS update status to 5U3 ROAMING NOT ALLOWED; storing the 5GS update status; and deleting each of a 5G-GUTI, a last visited registered TAI, a TAI list, and an ngKSI. In some embodiments, the program code causes further operations comprising: causing the apparatus to enter a state of 5GMM-DEREGISTERED or a state of 5GMM-DEREGISTERED.PLMN-SEARCH; and causing the apparatus to perform a SNPN selection. In some embodiments, the program code causes further operations comprising: determining whether the reject message has been successfully integrity checked by a NAS; and, if the reject message has been successfully integrity checked by the NAS, setting a SNPN-specific attempt counter for non-3GPP access for the SNPN to a user equipment implementation-specific maximum value. In some embodiments, the list of forbidden SNPNs is a permanently forbidden SNPNs list. In some embodiments, the list of forbidden SNPNs is a temporarily forbidden SNPNs list. In some embodiments, the list of forbidden SNPNs is a permanently forbidden SNPNs list for non-3GPP access. In some embodiments, the list of forbidden SNPNs is a temporarily forbidden SNPNs list for non-3GPP access.

According to yet another embodiment, an apparatus is provided that includes at least one processor and at least one memory including computer program code, the at least one memory and the computer program code configured to, with the at least one processor, cause the apparatus to at least: store a list of subscriber data, wherein each of entries in the list of subscriber data comprises subscriber data used to access a standalone non-public network (SNPN); maintain one or more lists of forbidden SNPNs and one or more SNPN-specific attempt counters; and, in an instance in which an entry of the list of subscriber data is reconfigured or removed, determine whether the identity of the SNPN associated with the reconfigured or removed entry should be removed from the one or more lists of forbidden SNPNs based on the one or more SNPN-specific attempt counters. In some embodiments, the one or more lists of forbidden SNPNs comprises a permanently forbidden SNPNs list. In some embodiments, the one or more lists of forbidden SNPNs comprises a temporarily forbidden SNPNs list. In some embodiments, the one or more lists of forbidden SNPNs comprises a permanently forbidden SNPNs list for non-3GPP access. In some embodiments, the one or more lists of forbidden SNPNs comprises a temporarily forbidden SNPNs list for non-3GPP access. In some embodiments, the one or more SNPN-specific attempt counters comprises a SNPN-specific attempt counter for 3GPP access. In some embodiments, the one or more SNPN-specific attempt counters comprises a SNPN-specific attempt counter for non-3GPP access.

According to still another embodiments, a method is provided, the method comprising storing a list of subscriber data, wherein each of entries in the list of subscriber data comprises subscriber data used to access a standalone non-public network (SNPN); maintaining one or more lists of forbidden SNPNs and one or more SNPN-specific attempt counters; and, in an instance in which an entry of the list of subscriber data is reconfigured or removed, determining whether the identity of the SNPN associated with the reconfigured or removed entry should be removed from the one or more lists of forbidden SNPNs based on the one or more SNPN-specific attempt counters. In some embodiments, the one or more lists of forbidden SNPNs comprises a permanently forbidden SNPNs list. In some embodiments, the one or more lists of forbidden SNPNs comprises a temporarily forbidden SNPNs list. In some embodiments, the one or more lists of forbidden SNPNs comprises a permanently forbidden SNPNs list for non-3GPP access. In some embodiments, the one or more lists of forbidden SNPNs comprises a temporarily forbidden SNPNs list for non-3GPP access. In some embodiments, the one or more SNPN-specific attempt counters comprises a SNPN-specific attempt counter for 3GPP access. In some embodiments, the one or more SNPN-specific attempt counters comprises a SNPN-specific attempt counter for non-3GPP access.

According to another embodiment, an apparatus is provided, such as an apparatus comprising one or more processors and one or more memory storing computer program code. Such an apparatus can be configured to carry out any of the methods described herein, such as by using the one or more processors to carry out computer-implemented instructions stored on the one or more memory. In some embodiments, the apparatus can comprise means for storing a list of subscriber data, wherein each of entries in the list of subscriber data comprises subscriber data used to access a standalone non-public network (SNPN); means for maintaining one or more lists of forbidden SNPNs and one or more SNPN-specific attempt counters; and means for, in an instance in which an entry of the list of subscriber data is reconfigured or removed, determining whether the identity of the SNPN associated with the reconfigured or removed entry should be removed from the one or more lists of forbidden SNPNs based on the one or more SNPN-specific attempt counters. In some embodiments, the one or more lists of forbidden SNPNs comprises a permanently forbidden SNPNs list. In some embodiments, the one or more lists of forbidden SNPNs comprises a temporarily forbidden SNPNs list. In some embodiments, the one or more lists of forbidden SNPNs comprises a permanently forbidden SNPNs list for non-3GPP access. In some embodiments, the one or more lists of forbidden SNPNs comprises a temporarily forbidden SNPNs list for non-3GPP access. In some embodiments, the one or more SNPN-specific attempt counters comprises a SNPN-specific attempt counter for 3GPP access. In some embodiments, the one or more SNPN-specific attempt counters comprises a SNPN-specific attempt counter for non-3GPP access.

In another example embodiment, a computer program product is provided that comprises a non-transitory computer readable medium including program code which, when executed, causes operations comprising: storing a list of subscriber data, wherein each of entries in the list of subscriber data comprises subscriber data used to access a standalone non-public network (SNPN); maintaining one or more lists of forbidden SNPNs and one or more SNPN-specific attempt counters; and, in an instance in which an entry of the list of subscriber data is reconfigured or removed, determining whether the identity of the SNPN associated with the reconfigured or removed entry should be removed from the one or more lists of forbidden SNPNs based on the one or more SNPN-specific attempt counters. In some embodiments, the one or more lists of forbidden SNPNs comprises a permanently forbidden SNPNs list. In some embodiments, the one or more lists of forbidden SNPNs comprises a temporarily forbidden SNPNs list. In some embodiments, the one or more lists of forbidden SNPNs comprises a permanently forbidden SNPNs list for non-3GPP access. In some embodiments, the one or more lists of forbidden SNPNs comprises a temporarily forbidden SNPNs list for non-3GPP access. In some embodiments, the one or more SNPN-specific attempt counters comprises a SNPN-specific attempt counter for 3GPP access. In some embodiments, the one or more SNPN-specific attempt counters comprises a SNPN-specific attempt counter for non-3GPP access.

According to another embodiment, an apparatus is provided, the apparatus comprising at least one processor; and at least one memory including computer program code, the at least one memory and the computer program code configured to, with the at least one processor, cause the apparatus to at least: store a list of subscriber data, wherein each entry of a plurality of entries in the list of subscriber data comprises subscriber data used to access standalone non-public networks (SNPNs); receive, from a network function in a (SNPN, a non-integrity-protected reject message, wherein information in the reject message implies that the entry used to access the SNPN is invalid; upon receipt of the reject message, determining whether the entry used to access the SNPN is invalid for the access via which the apparatus sent a request message and/or received the reject message and start T3247; and maintain one or more counters for the SNPN, wherein the one or more counters are used to determine whether the entry used to access the SNPN should be set to valid upon T3247 expiry. In some embodiments, the information in the reject message comprises a 5GMM cause value of #3 or #6. In some embodiments, the information in the reject message comprises an AUTHENTICATION REJECT message. In some embodiments, the reject message is a REGISTRATION REJECT message or a SERVICE REJECT message. In some embodiments, the one or more counters comprise one counter for the entry for the current SNPN considered invalid for 3GPP access events and one counter for the entry for the current SNPN considered invalid for non-3GPP access events.

In yet another embodiment, a method is provided, the method comprising storing a list of subscriber data, wherein each entry of a plurality of entries in the list of subscriber data comprises subscriber data used to access standalone non-public networks (SNPNs); receiving, from a network function in a (SNPN, a non-integrity-protected reject message, wherein information in the reject message implies that the entry used to access the SNPN is invalid; upon receipt of the reject message, determining whether the entry used to access the SNPN is invalid for the access via which the apparatus sent a request message and/or received the reject message and start T3247; and maintaining one or more counters for the SNPN, wherein the one or more counters are used to determine whether the entry used to access the SNPN should be set to valid upon T3247 expiry. In some embodiments, the information in the reject message comprises a 5GMM cause value of #3 or #6. In some embodiments, the information in the reject message comprises an AUTHENTICATION REJECT message. In some embodiments, the reject message is a REGISTRATION REJECT message or a SERVICE REJECT message. In some embodiments, the one or more counters comprise one counter for the entry for the current SNPN considered invalid for 3GPP access events and one counter for the entry for the current SNPN considered invalid for non-3GPP access events.

According to another embodiment, an apparatus is provided, such as an apparatus comprising one or more processors and one or more memory storing computer program code. Such an apparatus can be configured to carry out any of the methods described herein, such as by using the one or more processors to carry out computer-implemented instructions stored on the one or more memory. In some embodiments, the apparatus can comprise means for storing a list of subscriber data, wherein each entry of a plurality of entries in the list of subscriber data comprises subscriber data used to access standalone non-public networks (SNPNs); means for receiving, from a network function in a (SNPN, a non-integrity-protected reject message, wherein information in the reject message implies that the entry used to access the SNPN is invalid; means for, upon receipt of the reject message, determining whether the entry used to access the SNPN is invalid for the access via which the apparatus sent a request message and/or received the reject message and start T3247; and means for maintaining one or more counters for the SNPN, wherein the one or more counters are used to determine whether the entry used to access the SNPN should be set to valid upon T3247 expiry. In some embodiments, the information in the reject message comprises a 5GMM cause value of #3 or #6. In some embodiments, the information in the reject message comprises an AUTHENTICATION REJECT message. In some embodiments, the reject message is a REGISTRATION REJECT message or a SERVICE REJECT message. In some embodiments, the one or more counters comprise one counter for the entry for the current SNPN considered invalid for 3GPP access events and one counter for the entry for the current SNPN considered invalid for non-3GPP access events.

According to still another embodiment, a computer program product is provided, the computer program product comprising a non-transitory computer readable medium including program code which, when executed, causes operations comprising: storing a list of subscriber data, wherein each entry of a plurality of entries in the list of subscriber data comprises subscriber data used to access standalone non-public networks (SNPNs); receiving, from a network function in a (SNPN, a non-integrity-protected reject message, wherein information in the reject message implies that the entry used to access the SNPN is invalid; upon receipt of the reject message, determining whether the entry used to access the SNPN is invalid for the access via which the apparatus sent a request message and/or received the reject message and start T3247; and maintaining one or more counters for the SNPN, wherein the one or more counters are used to determine whether the entry used to access the SNPN should be set to valid upon T3247 expiry. In some embodiments, wherein the information in the reject message comprises a 5GMM cause value of #3 or #6. In some embodiments, the information in the reject message comprises an AUTHENTICATION REJECT message. In some embodiments, the reject message is a REGISTRATION REJECT message or a SERVICE REJECT message. In some embodiments, the one or more counters comprise one counter for the entry for the current SNPN considered invalid for 3GPP access events and one counter for the entry for the current SNPN considered invalid for non-3GPP access events.

According to another example embodiment, an apparatus is provided, the apparatus comprising at least one processor; and at least one memory including computer program code, the at least one memory and the computer program code configured to, with the at least one processor, cause the apparatus to at least: receive, from a network function in a standalone non-public network (SNPN), a reject message; initiate one or more timers configured to monitor a time elapsed since receiving the reject message; randomly determine a duration value within a predetermined range between a minimum value and a maximum value, the minimum value corresponding to a minimum safe duration for sending a subsequent registration request to the network function; determine via the one or more timers whether the time elapsed since receiving the reject message corresponds to the randomly selected duration value; and, in an instance in which it is determined that the time elapsed corresponds to the randomly selected duration value, send the subsequent registration request to the network entity. In some embodiments, the registration rejection message comprises a cause code indicating why the network entity is unable to register the apparatus. In some embodiments, the at least one memory and the computer program code are further configured to, with the at least one processor, cause the apparatus to at least: determine, based on at least the cause code, whether the registration rejection message is an integrity protected message. In some embodiments, the at least one memory and the computer program code are further configured to, with the at least one processor, cause the apparatus to at least: in an instance in which the registration rejection message is determined to be an integrity protected message, cause the subsequent registration request to be immediately sent to the network entity. In some embodiments, the at least one memory and the computer program code are further configured to, with the at least one processor, cause the apparatus to at least: send the initial registration request to the network entity, the initial registration request comprising at least identifying information for the user equipment. In some embodiments, the one or more counters are associated with entries of a list of subscriber data maintained by the apparatus, the one or more counters comprising: a first counter associated with an entry of the list of subscriber data for a non-private network considered for network access events; and a second counter associated with an entry of the list of subscriber data for a private network considered for network access events. In some embodiments, the list of subscriber data is a list of temporarily or permanently forbidden networks, wherein the at least one memory and the computer program code are further configured to, with the at least one processor, cause the apparatus to at least: in an instance in which, upon expiry of the second counter, the second counter has a value greater than zero but less than the randomly selected duration value, remove the entry of the list of subscriber data for the private network from the list of temporarily or permanently forbidden networks.

According to yet another embodiment, a method is provided, the method comprising receiving, from a network entity, in response to sending an initial registration request, a registration rejection message; initiating one or more timers configured to monitor a time elapsed since receiving the registration rejection message; randomly determining a duration value within a predetermined range between a minimum value and a maximum value, the minimum value corresponding to a minimum safe duration for sending a subsequent registration request to the network entity; determining via the one or more timers whether the time elapsed since receiving the registration rejection message corresponds to the randomly selected duration value; and, in an instance in which it is determined that the time elapsed corresponds to the randomly selected duration value, sending the subsequent registration request to the network entity. In some embodiments, the registration rejection message comprises a cause code indicating why the network entity is unable to register the apparatus. In some embodiments, the method further comprises determining, based on at least the cause code, whether the registration rejection message is an integrity protected message. In some embodiments, the method further comprises, in an instance in which the registration rejection message is determined to be an integrity protected message, causing the subsequent registration request to be immediately sent to the network entity. In some embodiments, the method further comprises sending the initial registration request to the network entity, the initial registration request comprising at least identifying information for the user equipment. In some embodiments, the one or more counters are associated with entries of a list of subscriber data maintained by the apparatus, the one or more counters comprising: a first counter associated with an entry of the list of subscriber data for a non-private network considered for network access events; and a second counter associated with an entry of the list of subscriber data for a private network considered for network access events. In some embodiments, the list of subscriber data is a list of temporarily or permanently forbidden networks, the method further comprising, in an instance in which, upon expiry of the second counter, the second counter has a value greater than zero but less than the randomly selected duration value, removing the entry of the list of subscriber data for the private network from the list of temporarily or permanently forbidden networks.

According to another embodiment, an apparatus is provided, such as an apparatus comprising one or more processors and one or more memory storing computer program code. Such an apparatus can be configured to carry out any of the methods described herein, such as by using the one or more processors to carry out computer-implemented instructions stored on the one or more memory. In some embodiments, the apparatus can comprise means for receiving, from a network entity, in response to sending an initial registration request, a registration rejection message; means for initiating one or more timers configured to monitor a time elapsed since receiving the registration rejection message; means for randomly determining a duration value within a predetermined range between a minimum value and a maximum value, the minimum value corresponding to a minimum safe duration for sending a subsequent registration request to the network entity; means for determining via the one or more timers whether the time elapsed since receiving the registration rejection message corresponds to the randomly selected duration value; and means for, in an instance in which it is determined that the time elapsed corresponds to the randomly selected duration value, sending the subsequent registration request to the network entity. In some embodiments, the registration rejection message comprises a cause code indicating why the network entity is unable to register the apparatus. In some embodiments, the apparatus can further comprise means for determining, based on at least the cause code, whether the registration rejection message is an integrity protected message. In some embodiments, the apparatus further comprises means for, in an instance in which the registration rejection message is determined to be an integrity protected message, causing the subsequent registration request to be immediately sent to the network entity. In some embodiments, the apparatus further comprises means for sending the initial registration request to the network entity, the initial registration request comprising at least identifying information for the user equipment. In some embodiments, the one or more counters are associated with entries of a list of subscriber data maintained by the apparatus, the one or more counters comprising: a first counter associated with an entry of the list of subscriber data for a non-private network considered for network access events; and a second counter associated with an entry of the list of subscriber data for a private network considered for network access events. In some embodiments, the list of subscriber data is a list of temporarily or permanently forbidden networks, and the apparatus can further comprise means for, in an instance in which, upon expiry of the second counter, the second counter has a value greater than zero but less than the randomly selected duration value, removing the entry of the list of subscriber data for the private network from the list of temporarily or permanently forbidden networks.

According to still another embodiment, a computer program product is provided, the computer program product comprising a non-transitory computer readable medium including program code which, when executed, causes operations comprising: receiving, from a network entity, in response to sending an initial registration request, a registration rejection message; initiating one or more timers configured to monitor a time elapsed since receiving the registration rejection message; randomly determining a duration value within a predetermined range between a minimum value and a maximum value, the minimum value corresponding to a minimum safe duration for sending a subsequent registration request to the network entity; determining via the one or more timers whether the time elapsed since receiving the registration rejection message corresponds to the randomly selected duration value; and, in an instance in which it is determined that the time elapsed corresponds to the randomly selected duration value, sending the subsequent registration request to the network entity. In some embodiments, the registration rejection message comprises a cause code indicating why the network entity is unable to register the apparatus. In some embodiments, the program code causes further operations comprising: determining, based on at least the cause code, whether the registration rejection message is an integrity protected message. In some embodiments, the program code causes further operations comprising, in an instance in which the registration rejection message is determined to be an integrity protected message, causing the subsequent registration request to be sent to the network entity. In some embodiments, the program code causes further operations comprising: sending the initial registration request to the network entity, the initial registration request comprising at least identifying information for the user equipment. In some embodiments, the one or more counters are associated with entries of a list of subscriber data maintained by the apparatus, the one or more counters comprising: a first counter associated with an entry of the list of subscriber data for a non-private network considered for network access events; and a second counter associated with an entry of the list of subscriber data for a private network considered for network access events. In some embodiments, the list of subscriber data is a list of temporarily or permanently forbidden networks, wherein the program code causes further operations comprising, in an instance in which, upon expiry of the second counter, the second counter has a value greater than zero but less than the randomly selected duration value, removing the entry of the list of subscriber data for the private network from the list of temporarily or permanently forbidden networks.

The above-noted aspects and features may be implemented in systems, apparatus, methods, and/or articles depending on the desired configuration. The details of one or more variations of the subject matter described herein are set forth in the accompanying drawings and the Detailed Description. Features and advantages of the subject matter described herein will be apparent from the description and drawings, and from the claims.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) may include machine instructions for a programmable processor and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

It shall be appreciated that the term user equipment is intended to cover any suitable type of wireless user equipment, such as mobile telephones, portable data processing devices or portable web browsers. It shall also be appreciated that the term user equipment is intended to cover any suitable type of non-portable user equipment, such as a television receiver, desk top data processing devices or set-top boxes.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non limiting examples.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

That which is claimed:

1. An apparatus comprising:
   at least one processor; and
   at least one memory storing instructions which, when executed by the at least one processor, cause the apparatus to at least perform:
   storing a list of subscriber data comprising entries, each entry comprising subscriber data that is used to access a respective one of multiple standalone non-public networks (SNPNs);
   maintaining a list of identities of permanently forbidden SNPNs and one SNPN-specific attempt counter for each entry of the list of subscriber data; and
   in an instance in which an entry in the list of subscriber data is reconfigured or removed, removing an identity of an SNPN associated with the entry from the list of identities of permanently forbidden SNPNs based on the SNPN-specific attempt counter corresponding to the entry having a value greater than zero and less than a maximum value.

2. The apparatus of claim 1, wherein the SNPN-specific attempt counter corresponding to the entry is a SNPN-specific attempt counter for 3rd Generation Partnership Project (3GPP) access.

3. The apparatus of claim 1, wherein the list of identities of permanently forbidden SNPNs is a list of identities of permanently forbidden SNPNs for non-3rd Generation Partnership Project (non-3GPP) access and the SNPN-specific attempt counter corresponding to the entry is a SNPN-specific attempt counter for non-3GPP access.

4. The apparatus of claim 1, wherein the instructions when executed by the at least one processor, cause the apparatus to at least perform:
   receiving, from a network function in a SNPN, a non-integrity-protected reject message, indicating that the entry used to access the SNPN is invalid;
   based on receipt of the non-integrity-protected reject message, starting a timer; and
   based on detection of expiration of the timer, set the entry used to access the SNPN to valid.

5. The apparatus of claim 4, wherein the timer is a 3rd Generation Partnership Project (3GPP) timer T3247.

6. A method of an apparatus, the method comprising:
   storing of a list of subscriber data comprising entries, each entry comprising subscriber data that is used to access a respective one of multiple standalone non-public networks (SNPNs);
   maintaining a list of identities of permanently forbidden SNPNs and one SNPN-specific attempt counter for each entry of the list of subscriber data; and
   in an instance in which an entry in the list of subscriber data is reconfigured or removed, removing an identity of an SNPN associated with the entry from the list of identities of permanently forbidden SNPNs based on the SNPN-specific attempt counter corresponding to the entry having a value greater than zero and less than a maximum value.

7. The method of claim 6, wherein the SNPN-specific attempt counter corresponding to the entry is a SNPN-specific attempt counter for 3rd Generation Partnership Project (3GPP) access.

8. The method of claim 6, wherein the list of identities of permanently forbidden SNPNs is a list of identities of permanently forbidden SNPNs for non-3rd Generation Partnership Project (non-3GPP) access and the SNPN-specific attempt counter corresponding to the entry is a SNPN-specific attempt counter for non-3GPP access.

9. The method of claim 6, further comprising:
   receive, from a network function in a SNPN, a non-integrity-protected reject message, indicating that the entry used to access the SNPN is invalid;
   based on receipt of the non-integrity-protected reject message, start a timer; and
   based on detection of expiration of the timer, set the entry used to access the SNPN to valid.

10. The method of claim 9, wherein the timer is a 3rd Generation Partnership Project (3GPP) timer T3247.

11. A non-transitory computer readable medium including program code which, when executed, causes operations comprising:
   storing of a list of subscriber data comprising entries, each entry comprising subscriber data that is used to access a respective one of multiple standalone non-public networks (SNPNs);
   maintaining a list of identities of permanently forbidden SNPNs and one SNPN-specific attempt counter for each entry of the list of subscriber data; and in an instance in which an entry in the list of subscriber data is reconfigured or removed, removing an identity of an SNPN associated with the entry from the list of identities of permanently forbidden SNPNs based on the SNPN-specific attempt counter corresponding to the entry having a value greater than zero and less than a maximum value.

12. The non-transitory computer readable medium of claim 11, wherein the SNPN-specific attempt counter corresponding to the entry is a SNPN-specific attempt counter for 3rd Generation Partnership Project (3GPP) access.

13. The non-transitory computer readable medium of claim 11, wherein the list of identities of permanently forbidden SNPNs is a list of identities of permanently forbidden SNPNs for non-3rd Generation Partnership Project (non-3GPP) access and the SNPN-specific attempt counter for the SNPN corresponding to the entry is a SNPN-specific attempt counter for non-3GPP access.

14. The non-transitory computer readable medium of claim 11, wherein the program code which, when executed, further causes operations comprising:
  receiving, from a network function in a SNPN, a non-integrity-protected reject message, indicating that the entry used to access the SNPN is invalid;
  based on receipt of the non-integrity-protected reject message, starting a timer; and
  based on detection of on expiration of the timer, setting the entry used to access the SNPN to valid.

15. The non-transitory computer readable medium of claim 14, wherein the timer is a 3rd Generation Partnership Project (3GPP) timer T3247.

* * * * *